US012723977B2

(12) United States Patent
Aker et al.

(10) Patent No.: US 12,723,977 B2
(45) Date of Patent: Sep. 1, 2026

(54) MODULAR SENSOR CORE VISUALIZATION SYSTEMS AND METHODS

(71) Applicant: Teledyne FLIR Defense, Inc., Stillwater, OK (US)

(72) Inventors: Craig Aker, Stillwater, OK (US); John Lynch, Stillwater, OK (US); Matthew Szabo, Stillwater, OK (US); Clinton M. Wichert, West Lafayette, IN (US); Robert C. Proebstel, Goleta, CA (US); Philip Tackett, West Lafayette, IN (US); Markus Erbeldinger, Pittsburgh, PA (US)

(73) Assignee: Teledyne FLIR Defense, Inc., Stillwater, OK (US)

( * ) Notice: Subject to any disclaimer, the term of this patent is extended or adjusted under 35 U.S.C. 154(b) by 369 days.

(21) Appl. No.: 17/611,116

(22) PCT Filed: May 13, 2020

(86) PCT No.: PCT/US2020/032741
§ 371 (c)(1),
(2) Date: Nov. 12, 2021

(87) PCT Pub. No.: WO2020/232167
PCT Pub. Date: Nov. 19, 2020

(65) Prior Publication Data

US 2022/0221398 A1 Jul. 14, 2022

Related U.S. Application Data

(60) Provisional application No. 62/847,291, filed on May 13, 2019, provisional application No. 62/855,743, filed on May 31, 2019.

(51) Int. Cl.
*G01N 21/3504* (2014.01)
*B64C 13/18* (2006.01)
(Continued)

(52) U.S. Cl.
CPC ......... *G01N 21/3504* (2013.01); *B64C 13/18* (2013.01); *G05D 1/0038* (2013.01);
(Continued)

(58) Field of Classification Search
CPC ....... G01N 21/3504; G01N 2021/3155; G01N 2201/0214; B64C 13/18; B64C 39/024;
(Continued)

(56) References Cited

U.S. PATENT DOCUMENTS

| | | | |
|---|---|---|---|
| 5,443,574 | A | 8/1995 | Ohtake et al. |
| 6,520,134 | B1 | 2/2003 | Plunkett et al. |

(Continued)

FOREIGN PATENT DOCUMENTS

| | | | |
|---|---|---|---|
| CN | 101017178 | A | 8/2007 |
| CN | 103399123 | A | 11/2013 |

(Continued)

OTHER PUBLICATIONS

Translation CN-107328730 Nov. 7, 2017 (Year: 2017).*
(Continued)

*Primary Examiner* — Peter J Macchiarolo
*Assistant Examiner* — Monica S Young
(74) *Attorney, Agent, or Firm* — Haynes and Boone, LLP

(57) ABSTRACT

Analyte survey systems (100) and related techniques are provided to improve the operation of handheld or unmanned mobile sensor or survey platforms. An analyte survey system includes a logic device (112) configured to communicate with a communication module (164) and a sensor assembly (166) of a modular sensor core (160), where the communication module is configured to establish a wireless communication link with a base station (130) associated with the modular sensor core and/or a mobile sensor plat-
(Continued)

form (110) and the sensor assembly is configured to provide analyte sensor data as the modular sensor core is maneuvered within a survey area.

20 Claims, 24 Drawing Sheets

(51) Int. Cl.
*B64U 10/14* (2023.01)
*B64U 10/25* (2023.01)
*B64U 101/31* (2023.01)
*B64U 101/35* (2023.01)
*G01N 21/31* (2006.01)
*G05D 1/00* (2024.01)

(52) U.S. Cl.
CPC ............. *G05D 1/102* (2013.01); *B64U 10/14* (2023.01); *B64U 10/25* (2023.01); *B64U 2101/31* (2023.01); *B64U 2101/35* (2023.01); *B64U 2201/20* (2023.01); *G01N 2021/3155* (2013.01); *G01N 2201/0214* (2013.01)

(58) Field of Classification Search
CPC .. G05D 1/0038; G05D 1/102; B64U 2101/35; B64U 10/13
USPC ........................................................... 73/1.06
See application file for complete search history.

(56) References Cited

U.S. PATENT DOCUMENTS

| | | | | |
|---|---|---|---|---|
| 7,581,425 | B2 * | 9/2009 | Forrest | G01N 33/0006 73/1.06 |
| 8,355,818 | B2 * | 1/2013 | Nielsen | G05D 1/0214 700/258 |
| 8,615,374 | B1 | 12/2013 | Discenzo | |
| 8,965,578 | B2 | 2/2015 | Versteeg et al. | |
| 9,031,779 | B2 * | 5/2015 | Djugash | G08G 1/0141 701/425 |
| 9,213,934 | B1 | 12/2015 | Versteeg et al. | |
| 10,140,540 | B2 | 11/2018 | Herrera et al. | |
| 2005/0000271 | A1 * | 1/2005 | Rabenecker | G01N 33/0009 73/23.2 |
| 2013/0278427 | A1 * | 10/2013 | Setton | G08B 21/12 340/584 |
| 2015/0277561 | A1 * | 10/2015 | Colby | G06F 3/016 345/156 |
| 2016/0266260 | A1 * | 9/2016 | Preston | G01T 1/208 |
| 2016/0363929 | A1 | 12/2016 | Clark et al. | |
| 2017/0092109 | A1 * | 3/2017 | Trundle | G08B 25/006 |
| 2017/0115218 | A1 * | 4/2017 | Huang | B64B 1/40 |
| 2018/0074488 | A1 * | 3/2018 | Cantrell | G08G 5/0013 |
| 2018/0284088 | A1 * | 10/2018 | Verbeck, IV | G01N 1/26 |
| 2018/0292374 | A1 * | 10/2018 | Dittberner | G08G 5/0086 |
| 2019/0120954 | A1 | 4/2019 | Kim et al. | |
| 2019/0128862 | A1 * | 5/2019 | Willett | B64C 39/024 |
| 2019/0156600 | A1 * | 5/2019 | Potyrailo | G07C 5/0816 |
| 2020/0017215 | A1 * | 1/2020 | Wu | B64C 39/024 |
| 2021/0033586 | A1 * | 2/2021 | Chadha | G01N 33/0065 |
| 2023/0314391 | A1 * | 10/2023 | Millar | G01N 33/0022 422/98 |

FOREIGN PATENT DOCUMENTS

| | | | | | |
|---|---|---|---|---|---|
| CN | 103453872 | A | | 12/2013 | |
| CN | 203414450 | U | | 1/2014 | |
| CN | 104807968 | A | * | 7/2015 | |
| CN | 107328730 | A | * | 11/2017 | G01N 21/3504 |
| CN | 206804614 | U | | 12/2017 | |
| CN | 108473305 | A | | 8/2018 | |
| CN | 208140627 | U | | 11/2018 | |
| CN | 109073619 | A | | 12/2018 | |
| CN | 208724021 | U | | 4/2019 | |
| GB | 264843 | A | | 11/1927 | |
| KR | 20170104233 | A | | 9/2017 | |

OTHER PUBLICATIONS

Dji, "Crystalsky", Crystalsky Specs, Nov. 17, 2017, 5 pages, DJI, China, https://web.archive.org/web/20171117062725/http://www.dji.com/crystalsky/info.
Honeywell, "AutoRAE 2 Automatic Test and Calibration System", AutoRAE 2 Data Sheet, Apr. 2018, 2 pages, Honeywell International Inc., United States of America.
Rossi et al: "Autonomous Gas Detection and Mapping With Unmanned Aerial Vehicles", IEEE Transactions on Instrumentation and Measurement, Apr. 2016, pp. 765-775, vol. 65, No. 4, IEEE, New Jersey, United States of America.
Feitz et al, "The Ginninderra CH4and CO2release experiment: An evaluation of gas detection and quantification techniques", International Journal of Greenhouse Gas Control, Mar. 2018, pp. 202-224, vol. 70, Elsevier Ltd., Amsterdam, Netherlands.
Allen et al, "The development and trial of an unmanned aerial system for the measurement of methane flux from landfill and greenhouse gas emission hotspots", Waste Management, Jan. 2018, pp. 883-892, vol. 87, Elsevier Ltd., New York, United States of America.

* cited by examiner

1602

1603

MODULAR SENSOR CORE VISUALIZATION SYSTEMS AND METHODS

CROSS-REFERENCE TO RELATED APPLICATIONS

This patent application is a U.S. National Stage Patent Application under 35 U.S.C. 371 of International Patent Application No. PCT/US2020/032741, filed May 13, 2020 and entitled "SYSTEM AND METHOD FOR REMOTE ANALYTE SENSING USING A MOBILE PLATFORM," which claims priority to and the benefit of U.S. Provisional Patent Application No. 62/847,291 filed May 13, 2019 and entitled "MODULAR SENSOR CORE SYSTEMS AND METHODS" and U.S. Provisional Patent Application No. 62/855,743 filed May 31, 2019 and entitled "MODULAR SENSOR CORE VISUALIZATION SYSTEMS AND METHODS," all of which are incorporated herein by reference in their entirety.

TECHNICAL FIELD

The present invention relates generally to modular sensor cores and, more particularly, to systems and methods for analyte characterization and localization by modular sensor cores coupled to mobile sensor platforms.

BACKGROUND

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. Operation of such systems typically includes real-time wireless transmissions between the unmanned platform and a remote base station, which often includes a display to efficiently convey telemetry, imagery, and other sensor data captured by the platform to an operator. The operator can often pilot or otherwise control an unmanned platform throughout an entire mission relying solely on received data from the unmanned platform.

Analyte sensor systems, such as sensor systems to detect hazardous chemical plumes in an environment, can benefit from handheld deployment or deployment on unmanned sensor platforms, but conventional analyte sensor systems are often unable to provide intuitive and contemporaneous visualization and/or characterization of such chemical plumes. Thus, there is a need for analyte sensor systems and technique to provide intuitive and contemporaneous visualization and/or characterization of hazardous chemical plumes.

SUMMARY

Analyte survey systems and related techniques are provided to improve the operation of handheld or unmanned mobile sensor or survey platforms. One or more embodiments of the described analyte survey systems may advantageously include a modular sensor core including a sensor assembly configured to provide analyte sensor data, a communication module configured to establish a wireless communication link with a base station associated with the modular sensor core and/or a coupled sensor platform, a position sensor to measure positions of a coupled mobile platform, a controller to control operation of the communication module, the position sensor, and/or the mobile platform, and one or more additional sensors to measure and provide sensor data corresponding to maneuvering and/or other operation of the mobile platform.

In various embodiments, such additional sensors may include a remote sensor system configured to capture sensor data of a survey area from which a two and/or three-dimensional spatial map of the survey area may be generated. For example, the mapping system may include one or more visible spectrum and/or infrared cameras and/or other remote sensor systems coupled to a mobile platform. The mobile platform may generally be a flight platform (e.g., a manned aircraft, a UAS, and/or other flight platform), a terrestrial platform (e.g., a motor vehicle), a water born platform (e.g., a watercraft or submarine), or a handheld platform.

In one embodiment, a system includes a logic device configured to communicate with a communication module and a sensor assembly of a modular sensor core coupled to a mobile platform, where the communication module is configured to establish a wireless communication link with a base station associated with the mobile platform, and the sensor assembly is configured to provide analyte sensor data as the mobile platform is maneuvered within a survey area. The logic device may be configured to receive the analyte sensor data as the mobile platform maneuvers within the survey area; receive position data corresponding to the analyte sensor data; and generate analyte survey information corresponding to the survey area based, at least in part, on a combination of the position data and the analyte sensor data. The logic device may also be configured to perform a bump check or calibration of the modular sensor core. The modular sensor core may include a relatively lightweight power supply to power sensor elements of the sensor assembly to allow the modular sensor core to be transported from a charging and/or calibration system to a mobile platform and not incur substantial delay in deployment.

In another embodiment, a method includes receiving analyte sensor data as a mobile platform maneuvers within a survey area; receiving position data corresponding to the analyte sensor data; and generating analyte survey information corresponding to the survey area based, at least in part, on a combination of the position data and the analyte sensor data. In an additional embodiment, a method includes mounting a sensor cradle to a sensor platform, removing the modular sensor core from a calibration system, securing the modular sensor core to the sensor cradle, and deploying the modular sensor core and/or the sensor platform.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Analyte survey systems and related techniques are provided to improve the operational flexibility and reliability of sensor platforms. In particular, embodiments include a modular sensor core that can be easily secured and removed from a corresponding sensor cradle that can itself be mounted to and among various devices, including various types of mobile sensor platforms, calibration systems, fixed sensor platforms, and/or other devices without incurring downtime due to sensor element deactivation.

Modern unmanned sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments. Such systems typically rely on a portable power source that can limit their range of travel. Embodiments described herein provide relatively lightweight analyte sensor systems that typically increase the achievable range of such unmanned sensor platforms, which can be particularly helpful when attempting characterize a plume of analyte over time that is hazardous to humans. Embodiments described herein are also modular, which allows a sensor core to be used in a series of sensor platforms without incurring substantial downtime related to demounting and mounting of the sensor core between sensor platforms. Embodiments described herein are also provided with relatively lightweight internal power supplies configured to keep all sensor elements active so as not to incur substantial downtime related to a warm up time for any deactivated sensor element.

In various embodiments, analyte sensor data generated a modular sensor core, according to embodiments described herein, may be transmitted to a base station, either in real-time or after an operation, which may be configured to combine the analyte sensor data with a map or floor plan of a survey area to present the analyte sensor data in an analyte map, such as a heat map, that specifies analyte data (e.g., concentrations and/or other characteristics) over the spatial extents of the map or floor plan. Such map or floor plan may be two or three dimensional. The analyte map may be stored at the base station and, if the base station includes a display, be presented in real time as a graphical overlaid map to an operator/user. During operation, this may provide insight for positioning the unmanned sensor platform for stationary observation, for example, or, if operation is to be undertaken in the same area at a future time, such analyte map may provide information for route planning of future operations.

Figure 1:
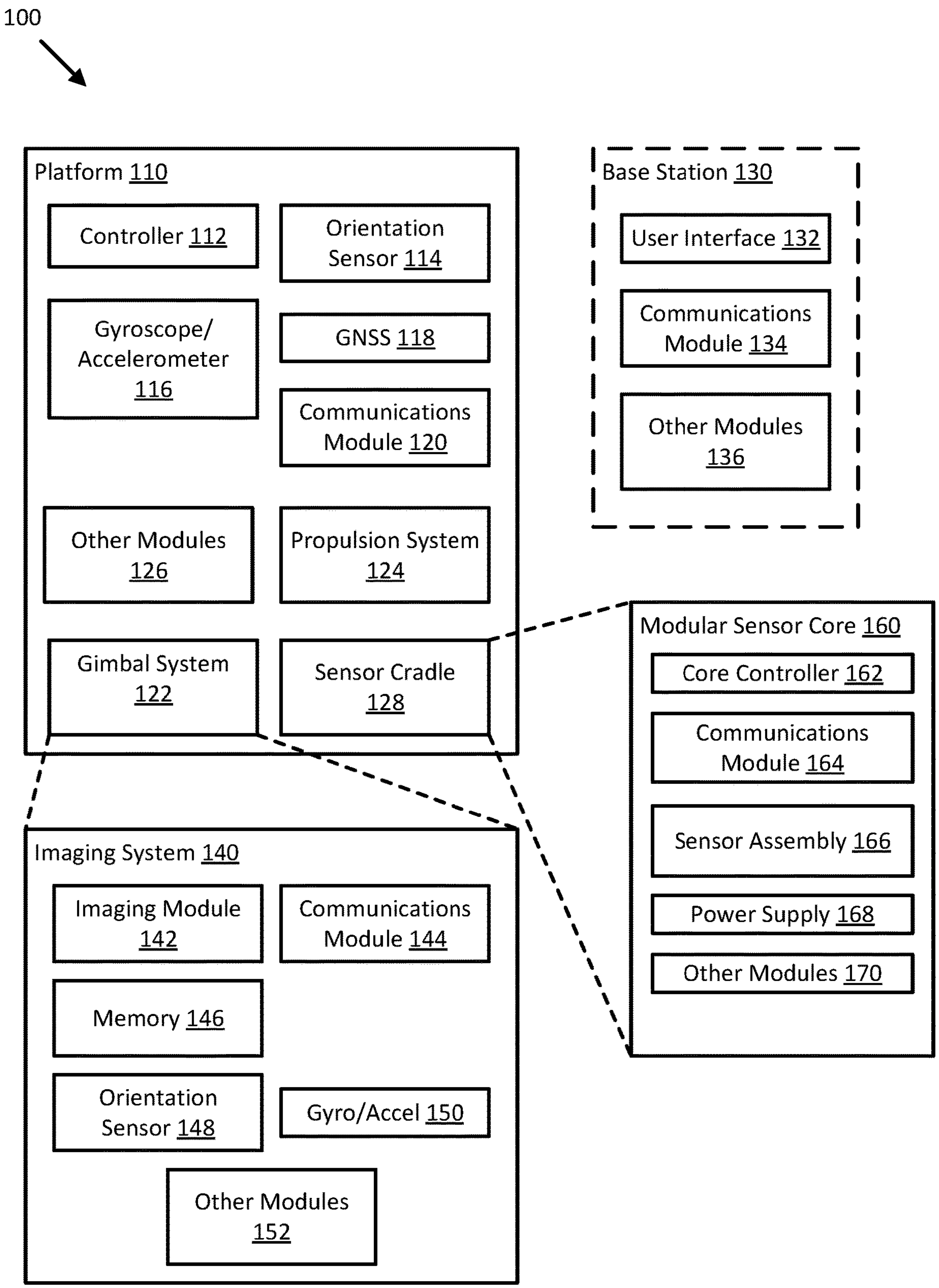
FIG. 1 illustrates a diagram of an analyte survey system in accordance with an embodiment of the disclosure.

FIG. 1 illustrates a block diagram of analyte survey system 100 in accordance with an embodiment of the disclosure. In some embodiments, system 100 may be configured to fly over a scene, through a structure, or approach a target and image or sense the scene, structure, or target, or portions thereof, using gimbal system 122 to aim imaging system/sensor payload 140 at the scene, structure, or target, or portions thereof. Resulting imagery and/or other sensor data may be processed (e.g., by sensor payload 140, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of platform 110 and/or sensor payload 140, as described herein, such as controlling gimbal system 122 to aim sensor payload 140 towards a particular direction or controlling propulsion system 124 to move platform 110 to a desired position in a scene or structure or relative to a target.

In additional embodiments, system 100 may be configured to use platform 110 to position modular sensor core 160 at the scene, structure, or target, or portions thereof. Resulting imagery and/or other sensor data may be processed (e.g., by modular sensor core 160, platform 110, and/or base station 130) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of platform 110 and/or modular sensor core 160, as described herein, such as controlling propulsion system 124 to move platform 110 to a desired position in a scene or structure or relative to a target.

In the embodiment shown in FIG. 1, analyte survey system 100 includes platform 110, optional base station 130, and at least one modular sensor core 160. Platform 110 may be a mobile platform configured to move or fly and position modular sensor core 160 (e.g., relative to a designated or detected target). As shown in FIG. 1, platform 110 may include one or more of a controller 112, an orientation sensor 114, a gyroscope/accelerometer 116, a global navigation satellite system (GNSS) 118, a communications module 120, a gimbal system 122, a propulsion system 124, a sensor cradle 128, and other modules 126. Operation of platform 110 may be substantially autonomous and/or partially or completely controlled by optional base station 130, which may include one or more of a user interface 132, a communications module 134, and other modules 136. In other embodiments, platform 110 may include one or more of the elements of base station 130, such as with various types of manned aircraft, terrestrial vehicles, and/or surface or sub-surface watercraft.

Sensor payload 140 and/or modular sensor core 160 may be physically coupled to platform 110 and be configured to capture sensor data (e.g., visible spectrum images, infrared images, narrow aperture radar data, analyte sensor data, and/or other sensor data) of a target position, area, and/or object(s) as selected and/or framed by operation of platform 110 and/or base station 130. In some embodiments, one or more of the elements of system 100 may be implemented in a combined housing or structure that can be coupled to or within platform 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 110 and/or other elements of system 100, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of platform 110, for example, or distributed as multiple logic devices within platform 110, base station 130, and/or sensor payload 140.

In some embodiments, controller 112 may be configured to substantially continuously monitor and/or store the status of and/or sensor data provided by one or more elements of platform 110, sensor payload 140, modular sensor core 160, and/or base station 130, such as the position and/or orientation of platform 110, sensor payload 140, and/or base station 130, for example, and the status of a communication link established between platform 110, sensor payload 140, modular sensor core 160, and/or base station 130. Such communication links may be configured to be established and then transmit data between elements of system 100 substantially continuously throughout operation of system 100, where such data includes various types of sensor data, control parameters, and/or other data.

Orientation sensor 114 may be implemented as one or more of a compass, float, accelerometer, and/or other device capable of measuring an orientation of platform 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of platform 110 (e.g., or an element of platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Communications module 120 may be implemented as any wired and/or wireless communications module configured to transmit and receive analog and/or digital signals between elements of system 100. For example, communications module 120 may be configured to receive flight control signals and/or data from base station 130 and provide them to controller 112 and/or propulsion system 124. In other embodiments, communications module 120 may be configured to receive images and/or other sensor information (e.g., visible spectrum and/or infrared still images or video images) from sensor payload 140 and relay the sensor data to controller 112 and/or base station 130. In further embodiments, communications module 120 may be configured to receive analyte sensor data and/or other sensor information from modular sensor core 160 and relay the sensor data to controller 112 and/or base station 130. In some embodiments, communications module 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications.

In some embodiments, communications module 120 may be configured to monitor the status of a communication link established between platform 110, sensor payload 140, and/or base station 130. Such status information may be provided to controller 112, for example, or transmitted to other elements of system 100 for monitoring, storage, or further processing, as described herein. Communication links established by communication module 120 may be configured to transmit data between elements of system 100 substantially continuously throughout operation of system 100, where such data includes various types of sensor data, control parameters, and/or other data, as described herein.

In some embodiments, gimbal system 122 may be implemented as an actuated gimbal mount, for example, that may be controlled by controller 112 to stabilize sensor payload 140 relative to a target or to aim sensor payload 140 according to a desired direction and/or relative position. As such, gimbal system 122 may be configured to provide a relative orientation of sensor payload 140 (e.g., relative to an orientation of platform 110) to controller 112 and/or communications module 120 (e.g., gimbal system 122 may include its own orientation sensor 114). In other embodiments, gimbal system 122 may be implemented as a gravity driven mount (e.g., non-actuated). In various embodiments, gimbal system 122 may be configured to provide power, support wired communications, and/or otherwise facilitate operation of articulated sensor/sensor payload 140. In further embodiments, gimbal system 122 may be configured to couple to a laser pointer, range finder, and/or other device, for example, to support, stabilize, power, and/or aim multiple devices (e.g., sensor payload 140 and one or more other devices) substantially simultaneously.

Propulsion system 124 may be implemented as one or more propellers, turbines, or other thrust-based propulsion systems, and/or other types of propulsion systems that can be used to provide motive force and/or lift to platform 110 and/or to steer platform 110. In some embodiments, propulsion system 124 may include multiple propellers (e.g., a tri, quad, hex, oct, or other type "copter") that can be controlled (e.g., by controller 112) to provide lift and motion for platform 110 and to provide an orientation for platform 110. In other embodiments, propulsion system 110 may be configured primarily to provide thrust while other structures of platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to platform 110, where each actuated device includes one or more actuators adapted to adjust an orientation of the device, relative to platform 110, in response to one or more control signals (e.g., provided by controller 112). In particular, other modules 126 may include a stereo vision system configured to provide image data that may be used to calculate or estimate a position of platform 110, for example, or to calculate or estimate a relative position of a navigational hazard in proximity to platform 110. In various embodiments, controller 130 may be configured to use such proximity and/or position information to help safely pilot platform 110 and/or monitor communication link quality, as described herein.

In various embodiments, sensor cradle 128 may be implemented as a latching mechanism that may be permanently mounted to platform 110 to provide a mounting position and/or orientation for modular sensor core 160 relative to a center of gravity of platform 110, relative to propulsion system 124, and/or relative to other elements of platform 110. In addition, sensor cradle 128 may be configured to provide power, support wired communications, and/or otherwise facilitate operation of modular sensor core 160, as described herein. As such, sensor cradle 128 may be configured to provide a power, telemetry, and/or other sensor data interface between platform 110 and modular sensor core 160.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communications module 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of platform 110 and/or other elements of system 100. For example, user interface 132 may be adapted to display a time series of positions, headings, and/or orientations of platform 110 and/or other elements of system 100 overlaid on a geographical map, which may include one or more graphs indicating a corresponding time series of actuator control signals, sensor information, and/or other sensor and/or control signals.

In some embodiments, user interface 132 may be adapted to accept user input including a user-defined target heading, waypoint, route, and/or orientation for an element of system 100, for example, and to generate control signals to cause platform 110 to move according to the target heading, route, and/or orientation, or to aim sensor payload 140 accordingly. In other embodiments, user interface 132 may be adapted to accept user input modifying a control loop parameter of controller 112, for example.

In further embodiments, user interface 132 may be adapted to accept user input including a user-defined target attitude, orientation, and/or position for an actuated or articulated device (e.g., sensor payload 140) associated with platform 110, for example, and to generate control signals for adjusting an orientation and/or position of the actuated device according to the target attitude, orientation, and/or position. Such control signals may be transmitted to controller 112 (e.g., using communications modules 134 and 120), which may then control platform 110 accordingly.

Communications module 134 may be implemented as any wired and/or wireless communications module configured to transmit and receive analog and/or digital signals between elements of system 100. For example, communications module 134 may be configured to transmit flight control signals from user interface 132 to communications module 120 or 144. In other embodiments, communications module 134 may be configured to receive sensor data (e.g., visible spectrum and/or infrared still images or video images, or other sensor data) from sensor payload 140. In some embodiments, communications module 134 may be configured to support spread spectrum transmissions, for example, and/or multiple simultaneous communications channels between elements of system 100. In various embodiments, communications module 134 may be configured to monitor the status of a communication link established between base station 130, sensor payload 140, and/or platform 110 (e.g., including packet loss of transmitted and received data between elements of system 100, such as with digital communication links), as described herein. Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of platform 110 and/or system 100 or to process sensor data to compensate for environmental conditions, such as an water content in the atmosphere approximately at the same altitude and/or within the same area as platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where imaging system/sensor payload 140 is implemented as an imaging device, imaging system/sensor payload 140 may include imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices (e.g., similar to controller 112) that can be configured to process imagery captured by detector elements of imaging module 142 before providing the imagery to memory 146 or communications module 144. More generally, imaging module 142 may be configured to perform any of the operations or methods described herein, at least in part, or in combination with controller 112 and/or user interface 132.

In some embodiments, sensor payload 140 may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 144 of sensor payload 140 may be implemented as any wired and/or wireless communications module configured to transmit and receive analog and/or digital signals between elements of system 100. For example, communications module 144 may be configured to transmit infrared images from imaging module 142 to communications module 120 or 134. In other embodiments, communications module 144 may be configured to receive control signals (e.g., control signals directing capture, focus, selective filtering, and/or other operation of sensor payload 140) from controller 112 and/or user interface 132. In some embodiments, communications module 144 may be configured to support spread spectrum transmissions, for example, and/or multiple simultaneous communications channels between elements of system 100. In various embodiments, communications module 144 may be configured to monitor the status of a communication link established between sensor payload 140, base station 130, and/or platform 110 (e.g., including packet loss of transmitted and received data between elements of system 100, such as with digital communication links), as described herein. Such status information may be provided to imaging module 142, for example, or transmitted to other elements of system 100 for monitoring, storage, or further processing, as described herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of sensor payload 140 may be implemented similar to orientation sensor 114 or gyroscope/accelerometer 116, and/or any other device capable of measuring an orientation of sensor payload 140, imaging module 142, and/or other elements of sensor payload 140 (e.g., magnitude and direction of roll, pitch, and/or yaw, relative to one or more reference orientations such as gravity and/or Magnetic North) and providing such measurements as sensor signals that may be communicated to various devices of system 100. Gyroscope/accelerometer (e.g., angular motion sensor) 150 of sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 140 and/or various elements of sensor payload 140 and providing such measurements as sensor signals that may be communicated to various devices of system 100.

Other modules 152 of sensor payload 140 may include other and/or additional sensors, actuators, communications modules/nodes, cooled or uncooled optical filters, and/or user interface devices used to provide additional environmental information associated with sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of platform 110 and/or system 100 or to process imagery to compensate for environmental conditions.

In various embodiments, modular sensor core/sensor payload 160 may be implemented as an analyte sensor configured to detect analytes in the environment surrounding platform 110. In the embodiment shown in FIG. 1, modular sensor core 160 includes core controller 162, communications module 164, sensor assembly 166, power supply 168, and other modules 170. In various embodiments, sensor assembly 166 may be implemented with one or more sensor elements configured to detect analytes in air proximate to platform 110 and/or modular sensor core 160. In some embodiments, modular sensor core 160 may be implemented with a second or additional sensor assembly 166, for example, which may be configured to detect various characteristics of analytes, such as ionizing radiation and/or other characteristics of analytes or other hazardous materials, as described herein.

Core controller 162 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of modular sensor core 160 and/or other elements of modular sensor core 160, for example. Such software instructions may also implement methods for processing sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by core controller 162. In these and other embodiments, core controller 162 may be implemented with other components where appropriate, such as volatile memory, non-volatile memory, one or more interfaces, and/or various analog and/or digital components for interfacing with modules of modular sensor core 160 and/or devices of system 100. For example, core controller 162 may be adapted to store sensor signals, sensor information, parameters for coordinate frame transformations, calibration parameters, sets of calibration points, and/or other operational parameters, over time, for example, and provide such stored data to a user using user interface 132. In some embodiments, core controller 162 may be integrated with one or more other elements of modular sensor core 160, for example, or distributed as multiple logic devices within platform 110, base station 130, and/or modular sensor core 160.

In some embodiments, controller 112 may be configured to substantially continuously monitor and/or store the status of and/or sensor data provided by one or more elements of sensor assembly 166 of modular sensor core 160, such as the position and/or orientation of platform 110, modular sensor core 160, and/or base station 130, for example, and the status of a communication link established between platform 110, modular sensor core 160, and/or base station 130. Such communication links may be configured to be established and then transmit data between elements of system 100 substantially continuously throughout operation of system 100, where such data includes various types of sensor data, control parameters, and/or other data.

Communications module 164 of modular sensor core 160 may be implemented as any wired and/or wireless communications module configured to transmit and receive analog and/or digital signals between elements of system 100. For example, communications module 164 may be configured to transmit analyte sensor data from sensor assembly 166 to communications module 120 of platform 110 (e.g., for further transmission to base station 130) or directly to communications module 134 of base station 130. In other embodiments, communications module 164 may be configured to receive control signals (e.g., control signals directing operation of modular sensor core 160) from controller 112 and/or user interface 132. In some embodiments, communications module 164 may be configured to support spread spectrum transmissions, for example, and/or multiple simultaneous communications channels between elements of system 100.

Sensor assembly 166 may be implemented as one or more sensor element supports (e.g., printed circuit boards), sensor elements, sample gas pumps, and/or other modules configured to detect analytes in the environment proximate to and/or otherwise associated with platform 110 and/or modular sensor core 160.

Power supply 168 may be implemented as any power storage device configured to provide enough power to each sensor element of sensor assembly 166 to keep all such sensor elements active and able to sense analytes while modular sensor core 160 is otherwise disconnected from external power (e.g., provided by platform 110 and/or base station 130). In various embodiments, power supply 168 may be implemented by a supercapacitor so as to be relatively lightweight and facilitate flight of platform 110 and/or relatively easy handheld operation of platform 110 (e.g., where platform 110 is implemented as a handheld sensor platform).

Other modules 170 of modular sensor core 160 may include other and/or additional sensors, actuators, communications modules/nodes, and/or user interface devices used to provide additional environmental information associated with modular sensor core 160, for example. In some embodiments, other modules 170 may include a humidity sensor, a wind and/or water temperature sensor, a barometer, a GNSS, and/or other environmental sensors providing measurements and/or other sensor signals that can be displayed to a user and/or used by core controller 162 or other devices of system 100 (e.g., controller 112) to provide operational control of platform 110 and/or system 100 or to process analyte sensor data to compensate for environmental conditions, as described herein.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for platform 110, using one or more power leads. Such power leads may also be used to support one or more communication techniques between elements of system 100.

Figure 2:
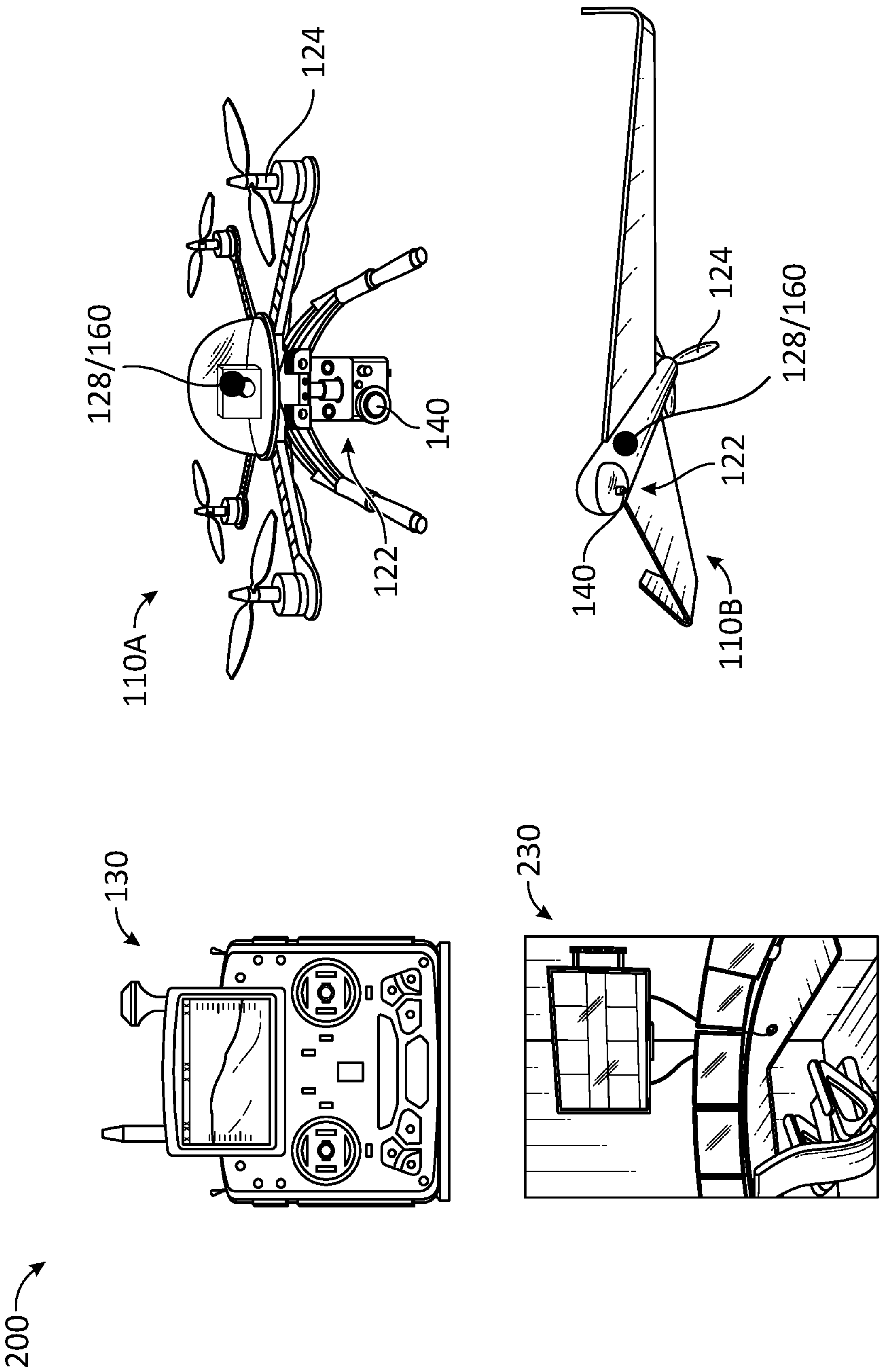
FIG. 2 illustrates a diagram of mobile platforms of an analyte survey system in accordance with an embodiment of the disclosure.

FIG. 2 illustrates a diagram of mobile platforms 110A and 110B of analyte survey system 200 including embodiments of modular sensor core 160 and associated sensor cradle 128 in accordance with an embodiment of the disclosure. In the embodiment shown in FIG. 2, analyte survey system 200 includes base station 130, optional co-pilot station 230, mobile platform 110A with articulated imaging system/sensor payload 140, gimbal system 122, modular sensor core 160, and sensor cradle 128, and mobile platform 110B with articulated imaging system/sensor payload 140, gimbal system 122, modular sensor core 160, and sensor cradle 128, where base station 130 and/or optional co-pilot station 230 may be configured to control motion, position, orientation, and/or general operation of platform 110A, platform 110B, sensor payloads 140, and/or modular sensor cores 160.

In various embodiments, co-pilot station 230 may be implemented similarly relative to base station 130, such as including similar elements and/or being capable of similar functionality. In some embodiments, co-pilot station 230 may include a number of displays so as to facilitate operation of modular sensor core 160 and/or various imaging and/or sensor payloads of mobile platforms 110A-B, generally separate from piloting mobile platforms 110A-Band, and to facilitate substantially real time analysis, visualization, and communication of sensor data and corresponding directives, such as to first responders in contact with a co-pilot or user of system 200. For example, base station 130 and co-pilot station 230 may each be configured to render any of the display views described herein.

Figure 3:
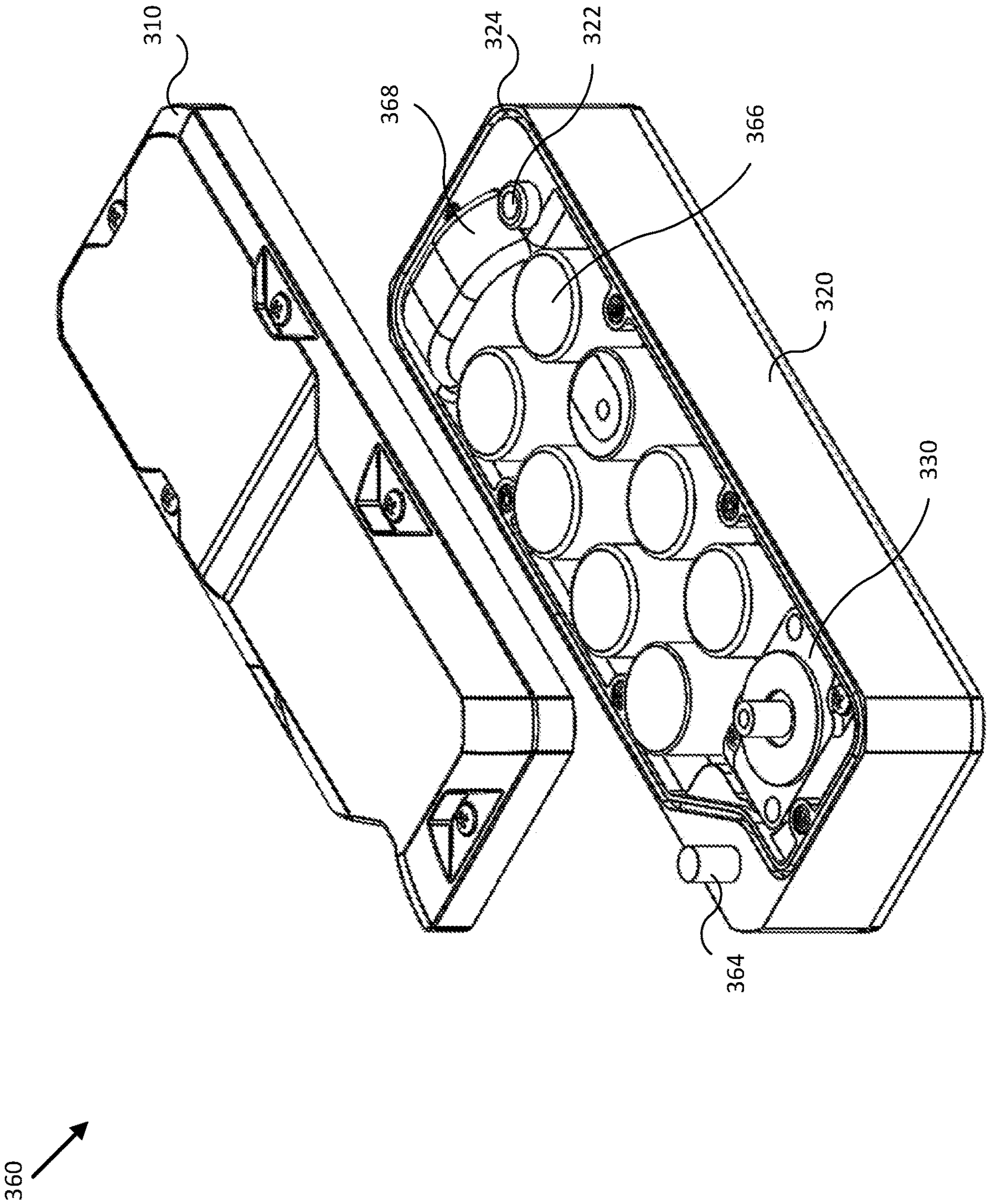
FIG. 3 illustrates a diagram of a modular sensor core for an analyte survey system in accordance with an embodiment of the disclosure.

FIG. 3 illustrates a diagram of a modular sensor core 360 for analyte survey system 100 in accordance with an embodiment of the disclosure. In FIG. 3, modular sensor core 360 includes enclosure cover 310, enclosure bottom 320, and sensor assembly 166 including multiple sensor elements 366 and a sample gas pump 330. Also shown are supercapacitor 368, sample gas inlet 322, enclosure bottom seal 324, and wireless communications antenna 364 (e.g., coupled to communications module 164).

An example list of sensor elements 366 are (with example readouts in the second and third columns):

| | | |
|---|---|---|
| PID | 0.01 | ppm |
| O2 | 20.2 | % vol $O_2$ |
| LEL | 5.6 | % vol |
| SO2 | 0.02 | ppm |
| CO | 0.01 | ppm |
| NO | 0.3 | ppm |
| H2S | 0.02 | ppm |
| CL2 | 0.01 | ppm |
| TVOC | 0.1 | ppm |
| CO2 | 430 | ppm. |

Where PID refers to a photoionization detector, LEL refers to a lower explosive limit, TVOC refers to total volatile organic compounds, and all other sensor element types are named after the chemical formula of the analytes they detect. In various embodiments, core controller 162 may be configured to detect when a sensor element reports a particular value above a threshold value (e.g., a threshold % vol or ppm) and issue an audible or visual alert (e.g., highlighting the reported value in red) when the reported value exceeds the threshold value. In addition, each sensor element 366 may be sensitive to one or more distinct analytes.

Supercapacitor 368 may be implemented as a 90 F or otherwise capacity aerogel-based capacitor and may in some embodiments be charged by an approximate 5.5 VDC supply provided over an electrical interface for modular sensor core 360. In general, supercapacitor 368 may be configured with sufficient capacity to supply power to each of sensor elements 366 in order to keep them active for a known period of time, such as 5-10 minutes. Typically, sensor elements may require 5 minutes or more warm up time before they are able to provide reliable calibrated analyte detection, and so supercapacitor 368 may be configured to keep them active while transporting modular sensor core 360 from a power source, such as a calibration system, to platform 110, or otherwise between external sources of power, so that modular sensor core 360 may be deployed with minimal delay, such as in a time critical survey application to protect first responders.

Figure 4:
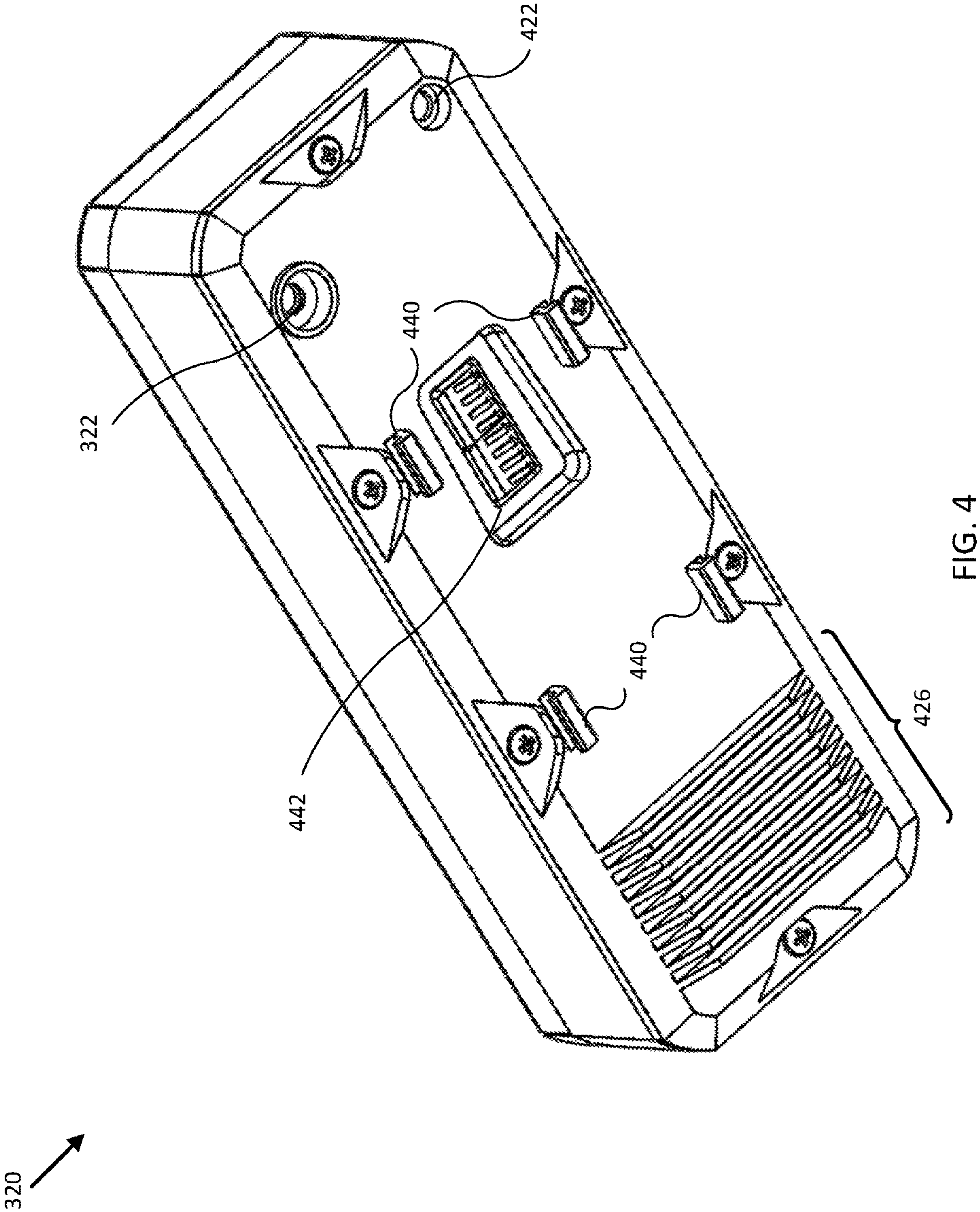
FIG. 4 illustrates a diagram of an enclosure bottom including a cradle attachment interface of a modular sensor core for an analyte survey system in accordance with an embodiment of the disclosure.

FIG. 4 illustrates a diagram of enclosure bottom 320 including a cradle attachment interface (e.g., mounting flanges 440, electrical interface 442, and pneumatic interface 322) of modular sensor core 360 for analyte survey system 100 in accordance with an embodiment of the disclosure. In various embodiments, mounting flanges 440 may be configured to releasably couple mechanically to a sensor cradle, as described herein. Electrical interface 442 may be implemented as an environmentally sealable electrical interface configured to support power delivery from platform 110 and/or wired communications between platform 110 and modular sensor core 360. Also shown in FIG. 4 is environmental sensor orifice 442 configured to provide environmental access for an environmental sensor of modular sensor core 360. In some embodiments, enclosure bottom 320 may additionally include louvered portion 426, for example, which may be configured to provide additional surface area with which to emit heat (e.g., to a surrounding medium, such as air, to act as a heat sink) and/or to provide a substantially unblocked sample gas exhaust for sample gas pump 330 of modular sensor core 360. In other embodiments, such sample gas exhaust may be routed through any available portion of cover 310 and/or bottom 320.

Figure 5:
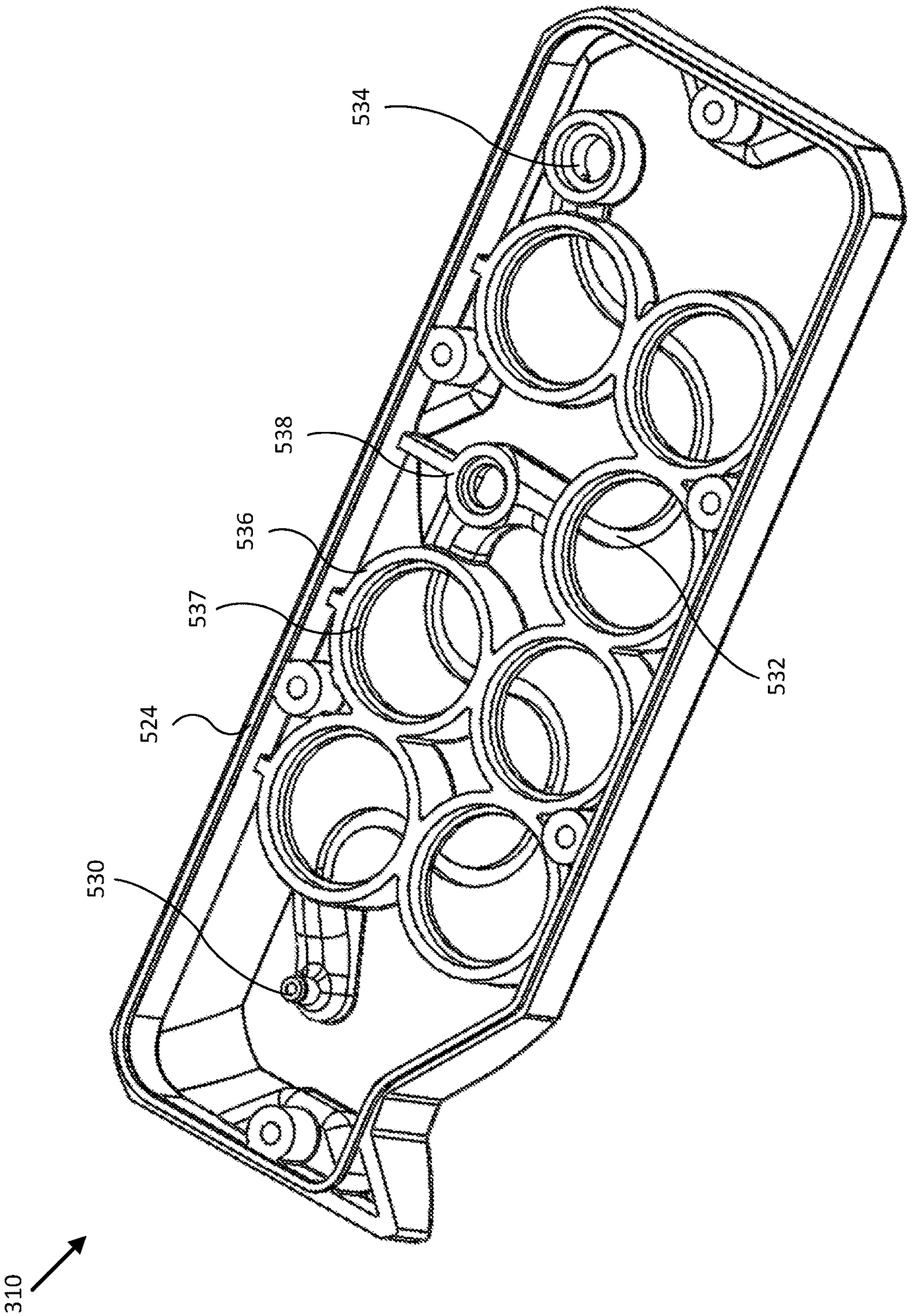
FIG. 5 illustrates a diagram of an enclosure cover including an integrated sample gas channel of a modular sensor core for an analyte survey system in accordance with an embodiment of the disclosure.

FIG. 5 illustrates a diagram of enclosure cover 310 including an integrated sample gas channel 532 of modular sensor core 360 for analyte survey system 100 in accordance with an embodiment of the disclosure. In FIG. 5, enclosure cover 310 includes enclosure cover seal 524, sample gas inlet 534, sample gas pump interface 530, multiple sample element receptacles 536 (e.g., relatively large) and 538 (e.g., relatively small) each with their own sample element seals 537 to ensure sample gas stays within sample gas channel 532 and sample element receptacles 536 and 538. On general, sample gas channel 532 allows sample gas pump 330 to draw sample gas from sample gas inlet 534 across the tops of sample elements 366 of sensor assembly 166 to allow the various sample element 366 to detect one or more analytes and/or concentrations of such analytes in the sample gas.

Figure 6:
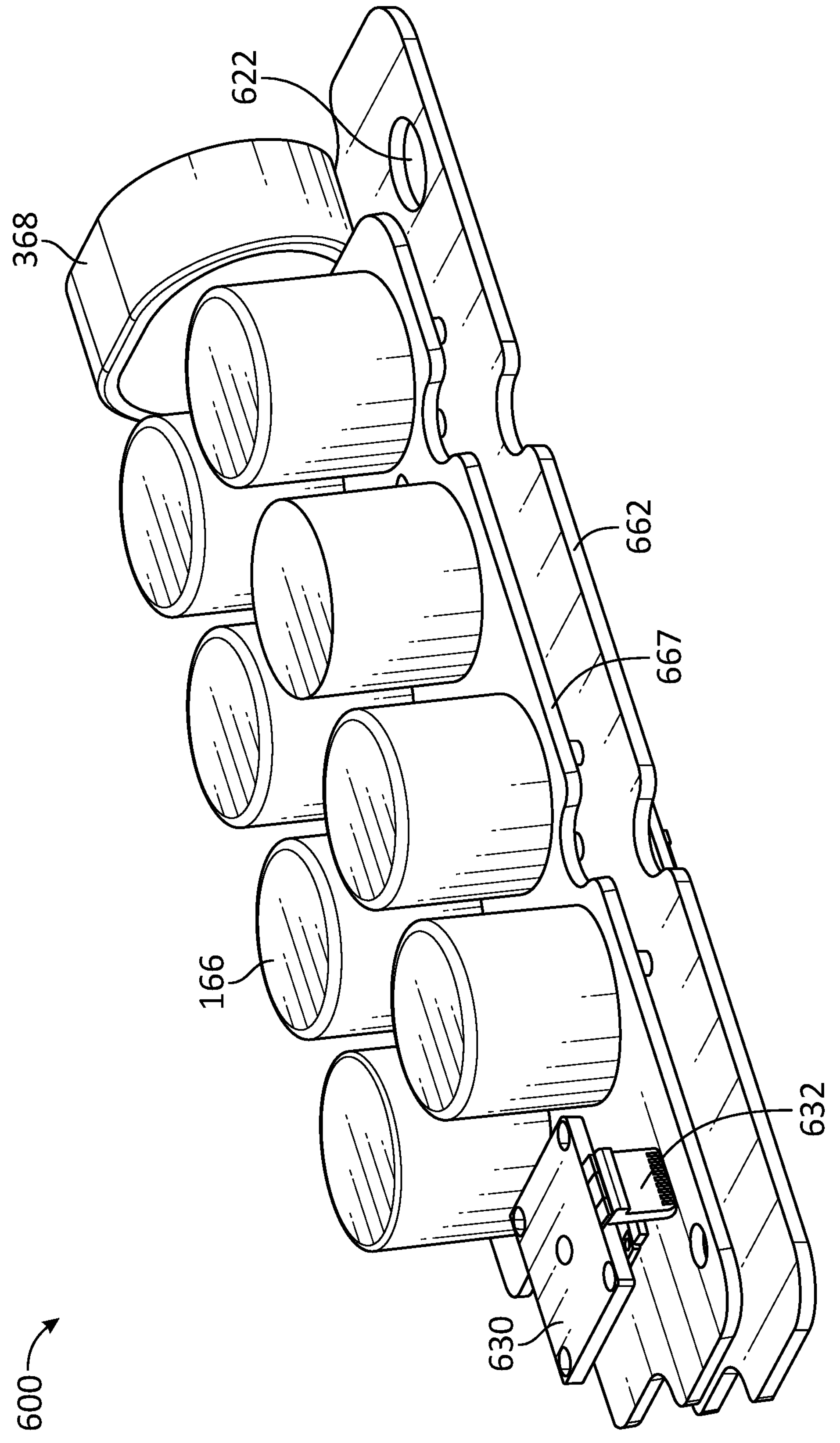
FIG. 6 illustrates a diagram of a sensor assembly of a modular sensor core for an analyte survey system in accordance with an embodiment of the disclosure.

FIG. 6 illustrates a diagram of a sensor assembly 600 of modular sensor core 360 for analyte survey system 100 in accordance with an embodiment of the disclosure. In various embodiments, sensor assembly 600 may be implemented similarly to sensor assembly 166 of FIG. 1. In FIG. 6, sensor assembly 600 includes a variety of sensor elements 166 releasably mounted to sensor support 667. For example, sensor support 667 may be implemented as a printed circuit board (PCB) with a number of sockets each configured to receive and mechanically and releasably secure a corresponding sensor element 166, as shown. Sensor support 667 may also include electrical connections between each sensor element 166 and power supply 168 and/or core controller 162, thereby providing for powering sensor elements 166 and/or monitoring sensor signals provided by sensor elements 166. Sensor support 667 may also include electrical connections between power supply 168 and electrical interface 632 of sample gas pump actuator 630.

In various embodiments, power supply 168, and in particular, power provided by supercapacitor 368, may be coupled to sensor elements 166 and/or sample gas pump actuator 630 via sensor support 667 and controller support 662, which may be implemented as a PCB. For example, supercapacitor 368 and/or core controller 162 may be mechanically coupled to controller support 662, for example, and controller support 662 may be mechanically and/or electrically coupled to sensor support 667 so as to support powering sensor elements 166 by supercapacitor 368 (e.g., and various power regulation circuitry of power supply 168) and/or monitoring sensor signals provided by sensor elements 166 (e.g., by core controller 162). Also shown in FIG. 7 is sample inlet orifice 622 in controller support 662, for example, configured to provide access for sample gas inlets 322/534.

Figure 7:
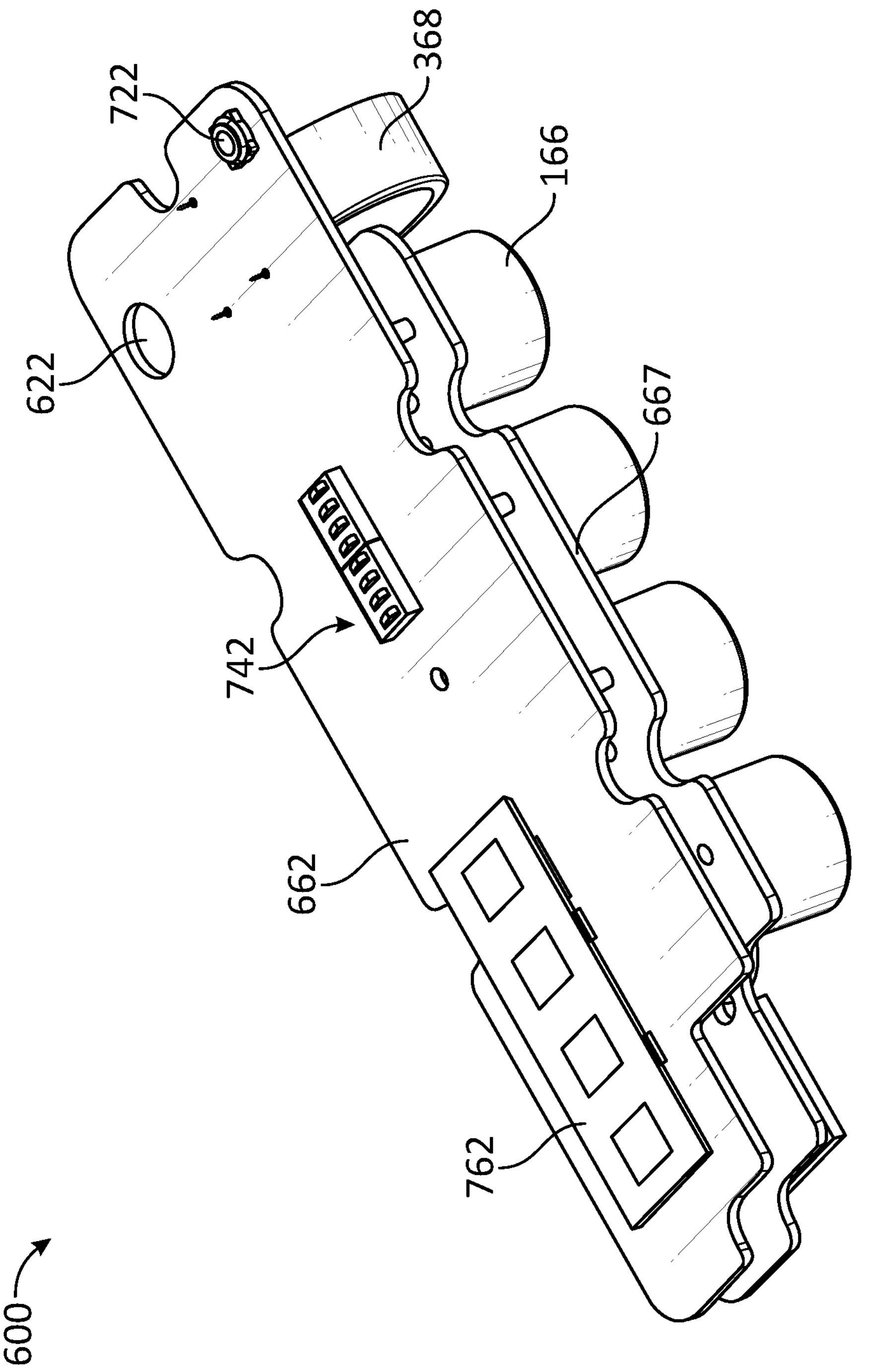
FIG. 7 illustrates a diagram of a core controller of a modular sensor core for an analyte survey system in accordance with an embodiment of the disclosure.

FIG. 7 illustrates a diagram of a core controller 762 of sensor assembly 600 for modular sensor core 360 for analyte survey system 100 in accordance with an embodiment of the disclosure. In various embodiments, core controller 762 may be implemented similarly and/or with similar functionality as core controller 162, communications module 164, power supply 168, and/or other modules 170 of modular sensor core 160 of FIG. 1. In FIG. 7, core controller 762 is mechanically and electrically coupled to controller support 662. Also shown in FIG. 7 are environmental sensor 772 and terminal blocks 742 mounted to controller support 662, which may be configured to provide mechanical support for and electrical connections between environmental sensor 772, terminal blocks 742, core controller 762, and supercapacitor 368, as shown. In some embodiments, core controller 762 may be configured to monitor a ground state of one or more pins of terminal blocks 742 and only allow power and/or data to be provided over terminal blocks 742 after such pin(s) are detected as grounded, in order to reduce or eliminate a risk of electrical damage to platform 110 and/or modular sensor core 360.

Figure 8:
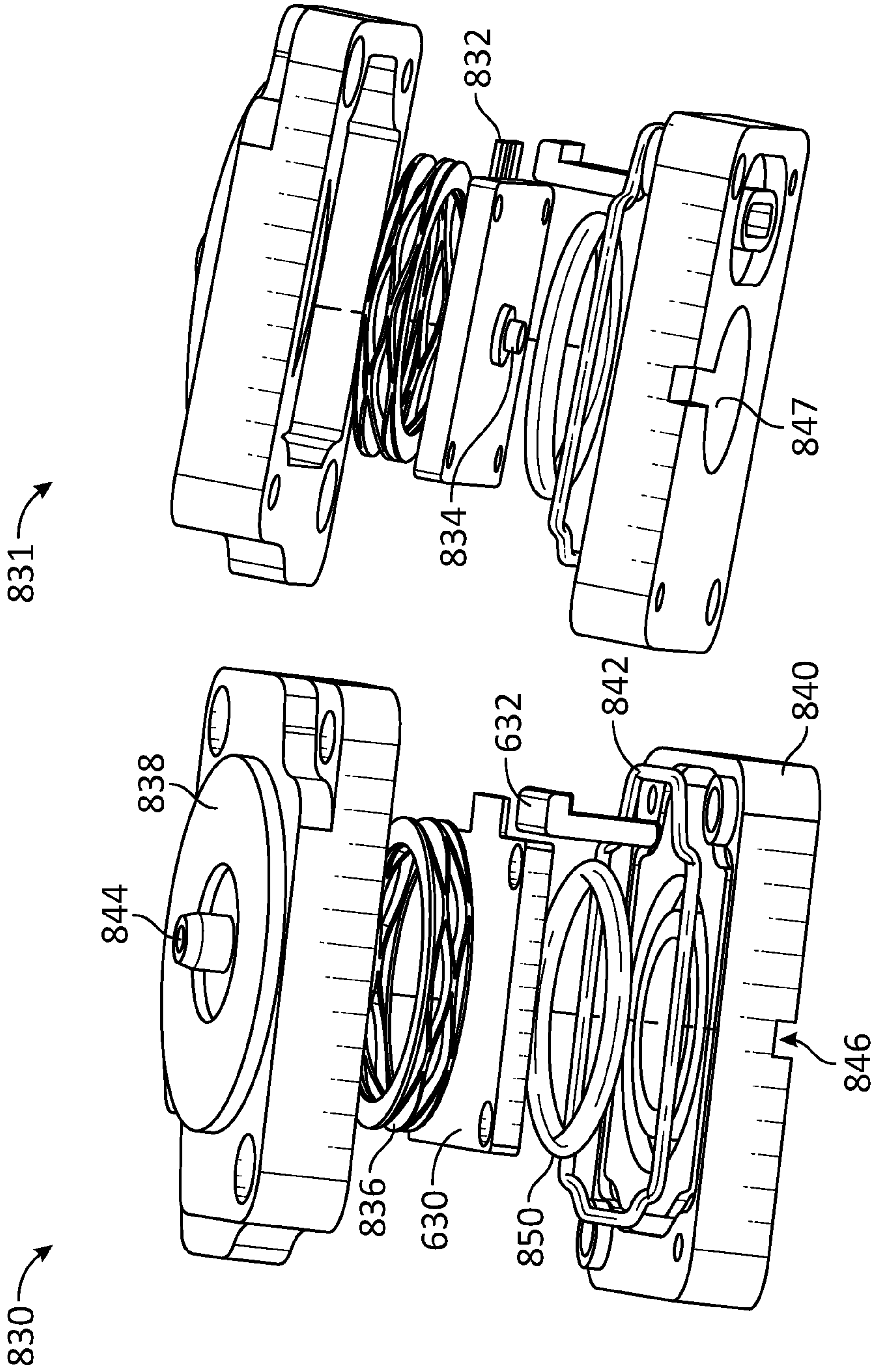
FIG. 8 illustrates a diagram of a sample gas pump for a sensor assembly of a modular sensor core for an analyte survey system in accordance with an embodiment of the disclosure.

FIG. 8 illustrates a diagram of a sample gas pump 830 for sensor assembly 600 of modular sensor core 360 for analyte survey system 100 in accordance with an embodiment of the disclosure. In particular, FIG. 8 shows two perspective exploded views 830 and 831 of the elements of sample gas pump 830. In FIG. 8, sample gas pump 830 may be implemented as a piezoelectric pump configured to draw sample gas in through pump inlet 844 and exhaust sample gas through exhaust channel 846. Sample gas pump 830 may include pump cover 838 configured to support or form pump inlet 844 (e.g., which may be configured to interface with pump interface 530 of cover 310) and house pump spring 836, pump actuator 630, and at least a portion of electrical interface 632, including pump actuator electrodes 832. Sample gas pump 830 may also include pump base 840 configured to support or form exhaust channel 846 and house or provide a seal channel for flow seal 850 and/or pump housing seal 842. Pump base 840 may also be configured to form an exhaust chamber 847 in which exhaust nozzle 834 of pump actuator 830 may project. Pump spring 836 may be configured to secure pump actuator 630 between pump cover 838 and pump base 840 and to provide vibration isolation/shock resistance for pump actuator 630. In some embodiments, exhaust nozzle 834, exhaust channel 846, and/or exhaust chamber 847 may be configured to interface with an exhaust tube configured to provide an outlet through cover 310 or bottom 320 for sample gas drawn into modular sensor core 360.

In alternative embodiments, flow seal 850 may be formed from closed-cell silicone foam, for example, and be configured to provide both a pneumatic seal within sample gas pump 830 and vibration isolation configured to protect elements of sample gas pump 830 (e.g. pump cover 838, pump actuator 630, pump base 840) from damage caused by impacts to modular sensor core 360 and/or platform 110. By incorporating such shock protection with flow seal 850, sample gas pump 830 and its mounting within modular sensor core 360 may be made more compact, for example, and servicing sample gas pump 830 may be a less complex process. In various embodiments, flow seal 850 may be implemented as two closed-cell silicon foam rings, one disposed between pump actuator 630 and pump cover 838 (e.g., and/or spring 836, which may in some embodiments be replaced by an element of flow seal 850), and one disposed between pump actuator 630 and pump base 840.

Figure 9:
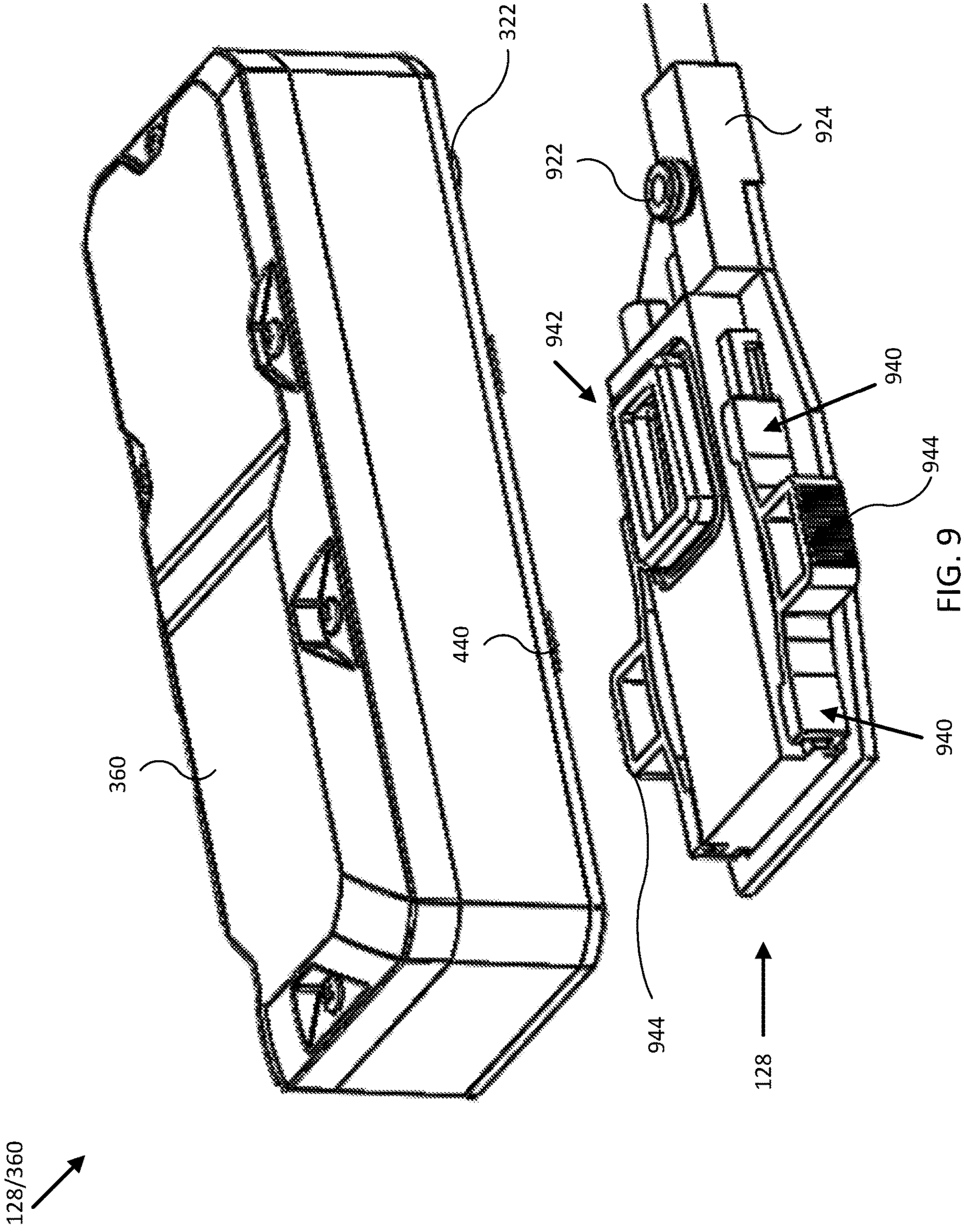
FIG. 9 illustrates a diagram of a sensor cradle for a modular sensor core of an analyte survey system in accordance with an embodiment of the disclosure.

FIG. 9 illustrates a diagram of sensor cradle 128 for modular sensor core 360 of analyte survey system 100 in accordance with an embodiment of the disclosure. In FIG. 9, sensor cradle 128 includes sealable electrical interface 942, mechanical latches 940, mechanical lock releases 944, sealable pneumatic interface 922, and pneumatic interface extender 924. In various embodiments, mechanical lock releases 944 may be pressed towards a center of sensor cradle 128 to allow mounting flanges 440 of modular sensor core 360 to engage or disengage with mechanical latches 940. In some embodiments, mounting flanges 440 and mechanical latches 940 may be configured to allow modular sensor core 360 to be pressed into sensor cradle 128 and snap or lock into sensor cradle 128 (and form a sealed pneumatic interface via pneumatic interface 922 and/or form a sealed electrical interface via electrical interface 942) without actuating mechanical lock releases 944. In various embodiments, pneumatic interface extender 924 may be configured to sealably couple to an external tube or other interface to provide a conduit for gas samples to reach sealable pneumatic interface 922.

Figure 10:
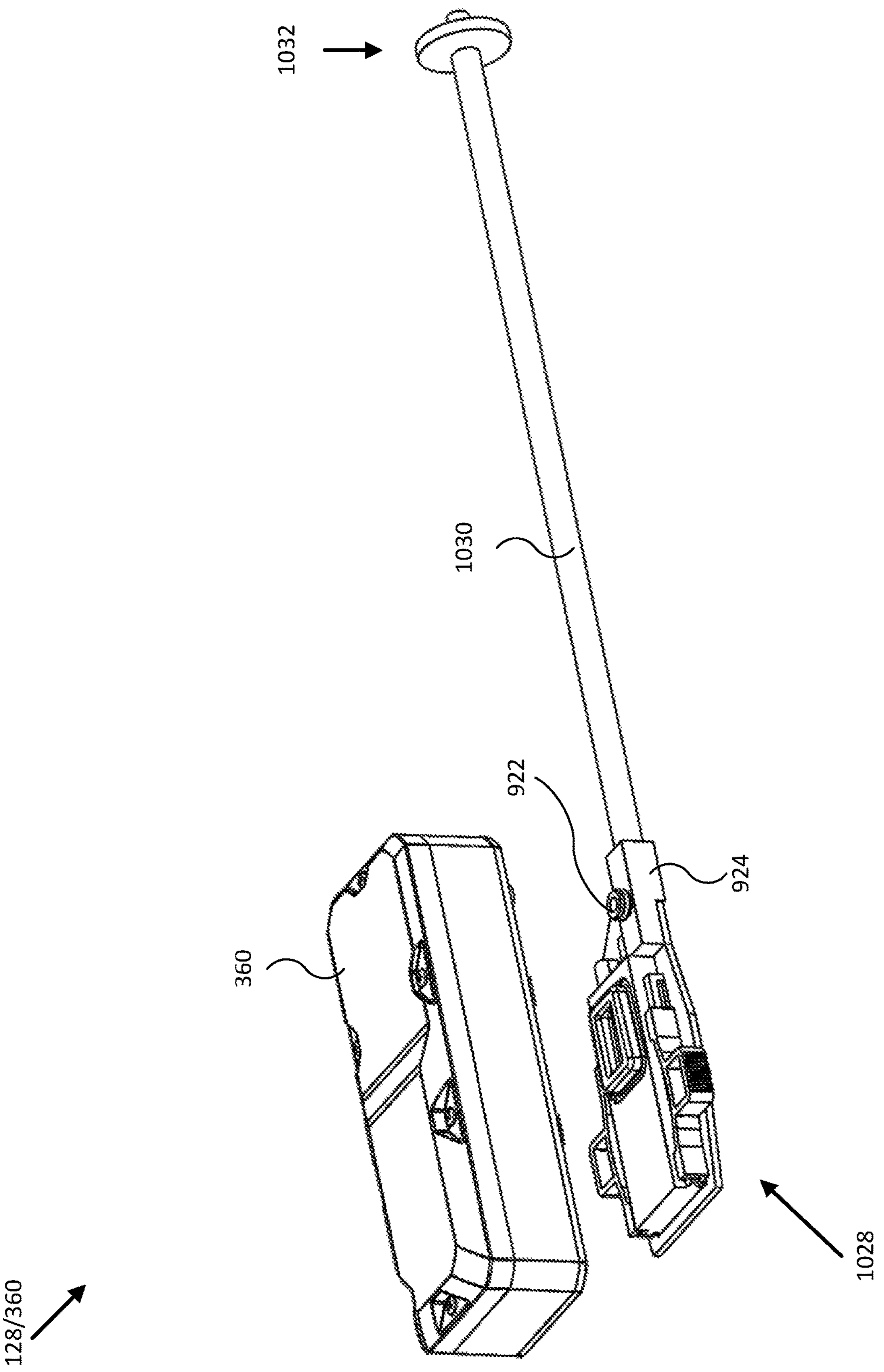
FIG. 10 illustrates a diagram of a sensor cradle including an external sample gas snorkel for a modular sensor core of an analyte survey system in accordance with an embodiment of the disclosure.

FIG. 10 illustrates a diagram of sensor cradle 1028 including an external sample gas snorkel 1030 for modular sensor core 360 of analyte survey system 100 in accordance with an embodiment of the disclosure. As shown in FIG. 10, external sample gas snorkel 1030 may be couple to sensor cradle 1028 at pneumatic interface extender 924 to facilitate collecting sample gas at a desired distance and/or relative orientation to sensor cradle 1028. External sample gas snorkel 1030 may be implemented as a carbon fiber tube (e.g., for lightweight applications), a metal tube (e.g., for heat or chemical resistance), a flexible tube, and/or other sample gas conduit and/or combinations thereof configured to hang from or couple to appendages of platform 110, for example, so as to sample gas outside a prop wash of platform 110 and/or a safe distance from platform 110 and/or modular sensor core 360 so as to allow safe sampling of a hazardous gas plume or combustion area. In various embodiments, external sample gas snorkel 1030 may be implemented with a particular filter 1032 to reduce or eliminate a risk of airborne particulates entering and/or damaging modular sensor core 360, sensor elements 166, and/or sample gas pump 330/830.

In various embodiments, modular sensor core 360 may weigh approximately 16 ounces, and sensor cradle 128 may weigh approximately 3 ounces. Other embodiments, including embodiments where modular sensor core 360 is modified to couple directly to platform 110 and/or with fewer sensor elements, may weigh a total of 2-25 ounces.

Figure 11:
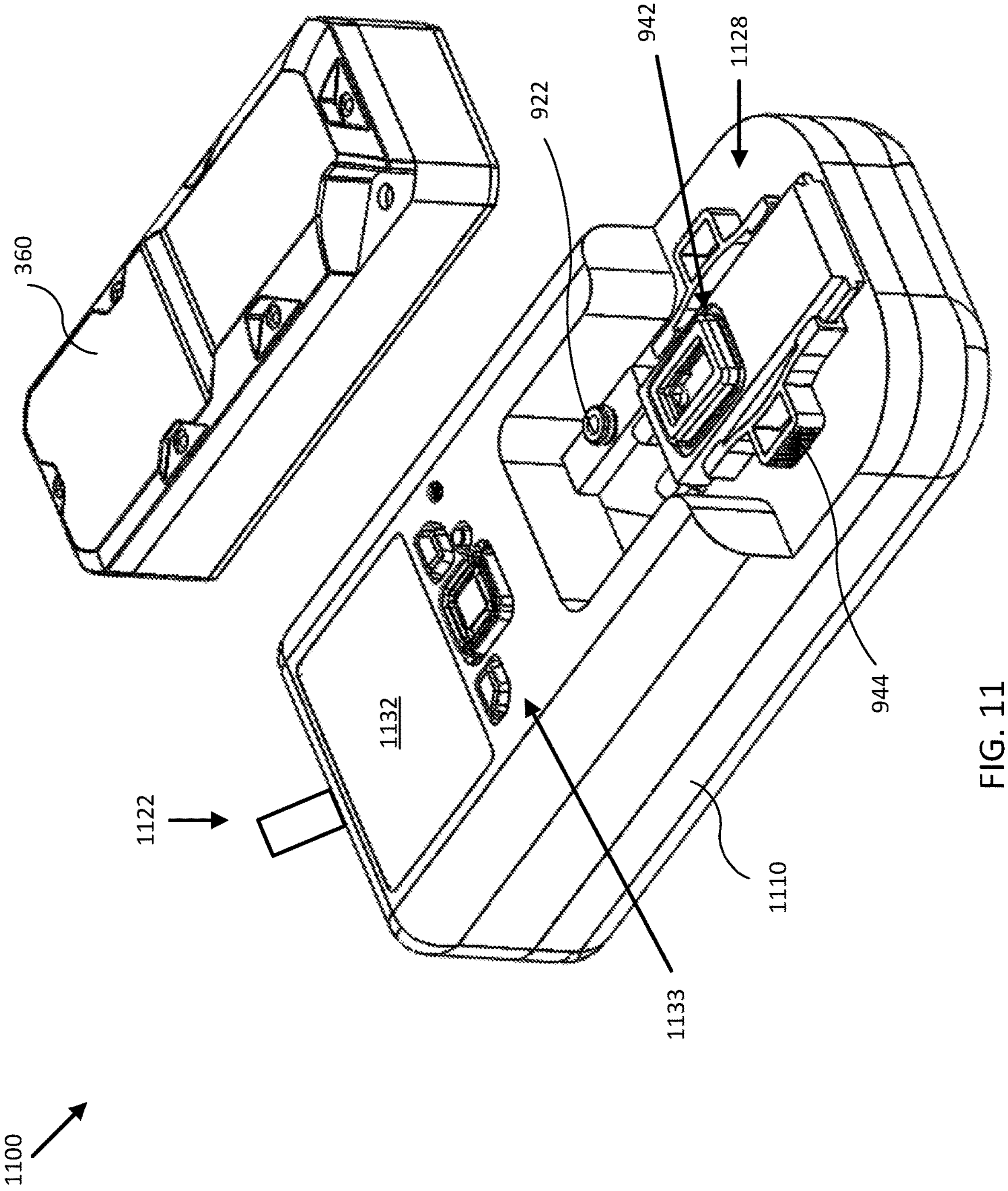
FIG. 11 illustrates a diagram of a calibration system including a sensor cradle for a modular sensor core of an analyte survey system in accordance with an embodiment of the disclosure.

FIG. 11 illustrates a diagram of a calibration system 1110 including a sensor cradle 1128 for modular sensor core 360 of analyte survey system 100 and/or 1100 in accordance with an embodiment of the disclosure. In FIG. 11, calibration system 1110 includes display 1132 and various buttons/joystick selection devices 1133 (e.g., elements of user interface 132), sample cradle 1128 configured to couple to modular sensor core 360, and optionally sample interface 1122. In various embodiments, calibration system 1100 may be configured to provide power to modular sensor core 360 over sealable electrical interface 942 and/or to provide metered calibration gas samples over sealable pneumatic interface 922, as controlled by user interface 1133.

In some embodiments, calibration system 1110 may be configured to perform a bump check of one or more sensor elements of sensor assembly 166, for example, where a bump gas sample including a particular analyte to which one or more sensor elements 366 are sensitive to is provided to modular sensor core 360 to cause those sensor elements 366 to register an analyte response, so as to ensure those sensor elements 366 are functioning. Such bump gas sample may include enough analyte to cause a measurable analyte response within the typical dynamic range of a calibrated sensor element.

In other embodiments, calibration system 1110 may be configured to perform a calibration check of one or more sensor elements of sensor assembly 166, for example, where a metered gas sample including a particular analyte (e.g., provided according to a selected or known concentration and rate) to which one or more sensor elements 366 are sensitive to is provided to modular sensor core 360 to cause those sensor elements 366 to register a known analyte response, so as to ensure those sensor elements 366 are functioning and to calibrate those sensor elements 366 to the selected or known analyte concentration and/or rate. Such calibration may include adjusting an amplitude, frequency, and/or other signal characteristic of a sensor control signal provided to a particular sensor element 366, for example, and/or to adjust an amplification and/or other sensor signal processing characteristic applied by core controller 162 to sensor signals provided by a particular sensor element 366, so as to provide a known analyte response to the metered gas sample.

In further embodiments, calibration system 1110 may be implemented as a portable user interface for modular sensor core 360, for example, and be configured to determine and display sensor data corresponding to gas samples processed by modular sensor core 360, such as analyte type, analyte concentration, and/or other analyte characteristics associated with and/or detectable by one or more of sensor elements 366 of sensor assembly 166. In some embodiments, a metered or other type of gas source may be coupled to calibration system 1110 via sample interface 1122 to facilitate bump check and/or calibration of modular sensor core 360. In particular embodiments, calibration system/portable user interface 1110 may be mounted to a pole and sample interface 1122 may be coupled to external sample gas snorkel 1030 in order to safely sample hazardous gas plumes while a user manually carries portable user interface 1110 and modular sensor core 360 in a handheld application.

In embodiments where calibration system 1110 is implemented as a portable user interface 1110 for modular sensor core 360, portable user interface 1110 may lack sample interface 1122, may include an internal battery or other power supply facilitating portable handheld use, and may omit any capability to perform a bump check or calibration of modular sensor core 360. Such embodiments of portable user interface 1110 may be lighter and smaller than embodiments of calibration system 1110, and such embodiments are smaller and lighter than conventional analyte sensor systems.

In further embodiments, portable user interface 1100 may be implemented as a fixed location installation system and be configured to continuously monitor the environment at the fixed location as analyte plumes proximate to modular sensor core 360 evolve over time. Corresponding analyte data may be transmitted to base station 130 live or be recorded and stored within modular sensor core 360 to be retrieved at a later date.

Figure 12:
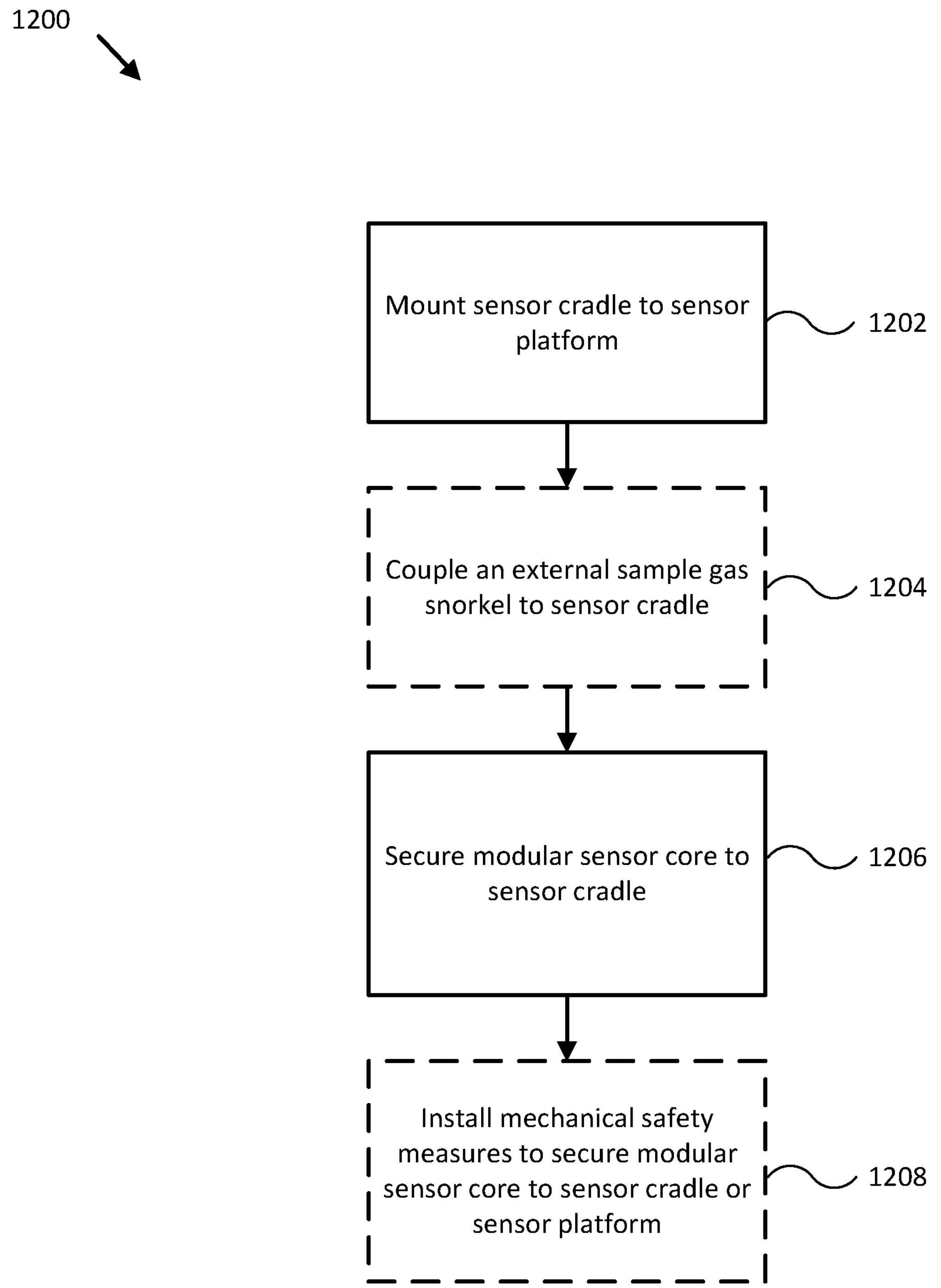
FIGS. 12-14 illustrate flow diagrams of various operations to provide analyte surveying using an analyte survey system in accordance with embodiments of the disclosure.
Figure 13:
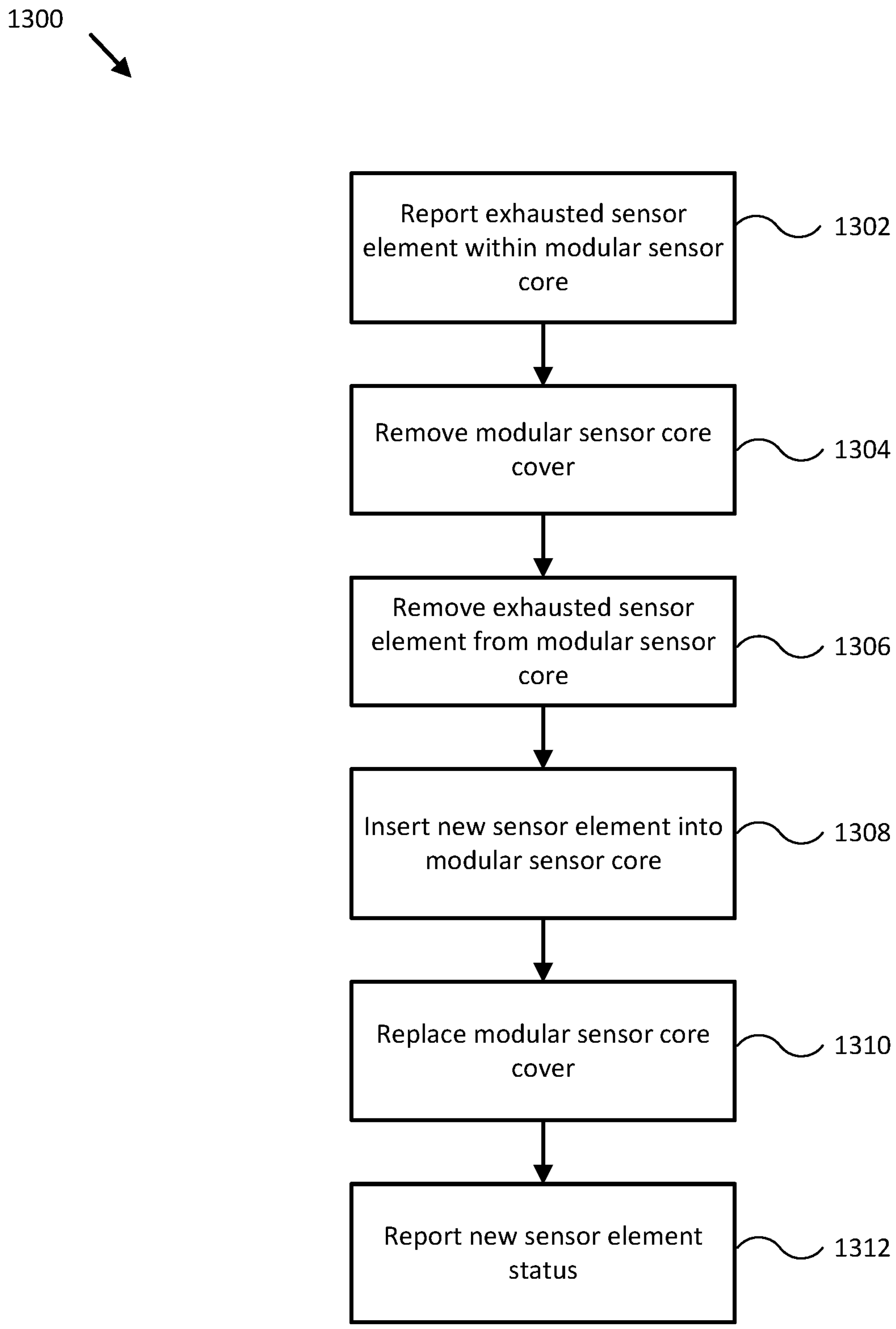
Figure 14:
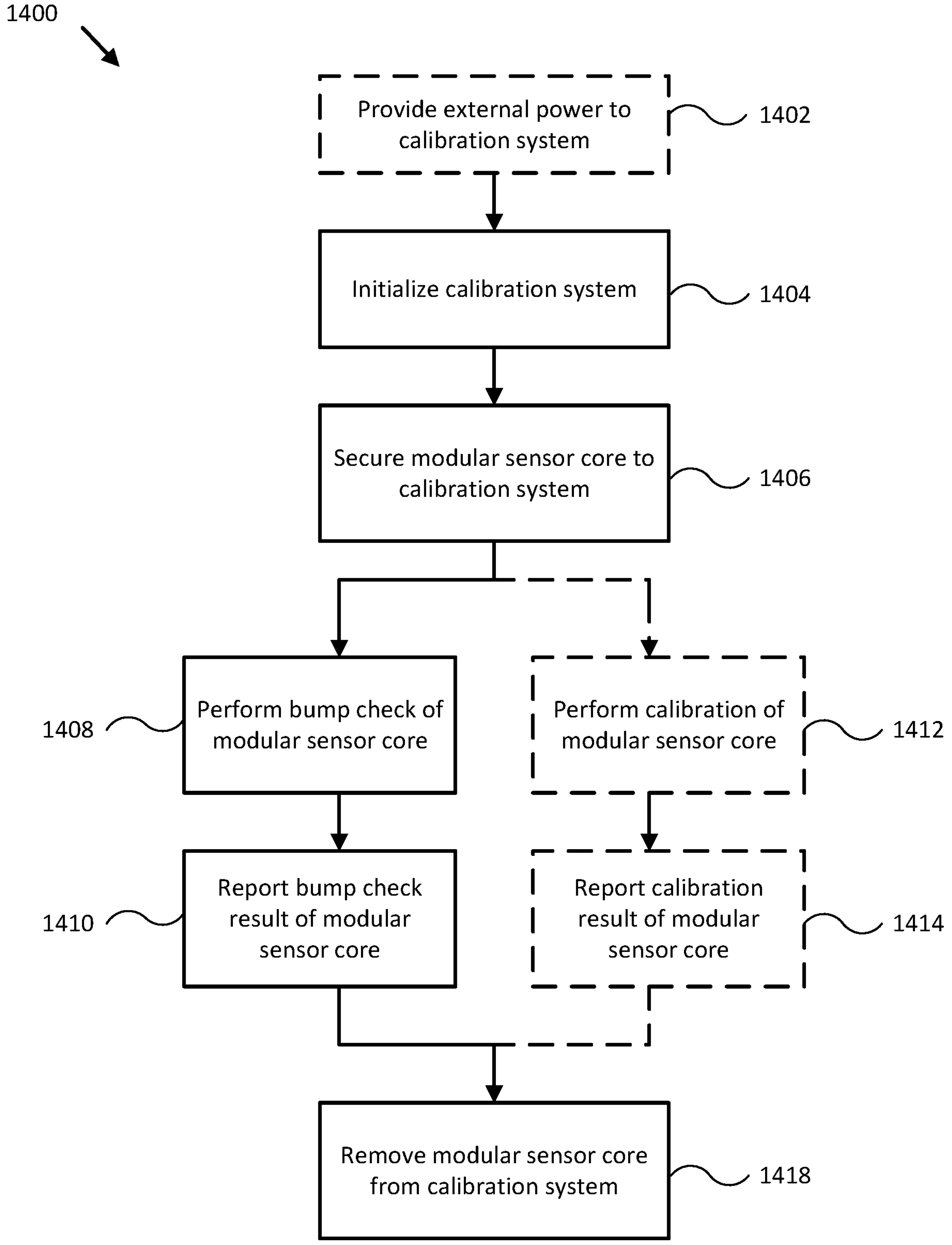

FIGS. 12-14 illustrate flow diagrams 1200, 1300, 1400 of various operations to provide analyte surveying using analyte survey system 100 in accordance with embodiments of the disclosure. In some embodiments, the operations of FIGS. 12-14 may be implemented as software instructions executed by one or more logic devices or controllers associated with corresponding electronic devices, sensors, and/or structures depicted in FIGS. 1-11. More generally, the operations of FIGS. 12-14 may be implemented with any combination of software instructions, mechanical elements, and/or electronic hardware (e.g., inductors, capacitors, amplifiers, actuators, or other analog and/or digital components).

It should also be appreciated that any step, sub-step, sub-process, or block of processes 1200, 1300, 1400 may be performed in an order or arrangement different from the embodiments illustrated by FIGS. 12-14. For example, in other embodiments, one or more blocks may be omitted from or added to each individual process. Furthermore, block inputs, block outputs, various sensor signals, sensor information, calibration parameters, and/or other operational parameters may be stored to one or more memories prior to moving to a following portion of a corresponding process. Although processes 1200, 1300, 1400 are described with reference to systems described in FIGS. 1-11, processes 1200, 1300, 1400 may be performed by other systems different from those systems and including a different selection of electronic devices, sensors, assemblies, mechanisms, platforms, and/or platform attributes.

Process 1200 of FIG. 12 may generally correspond to a method for assembling analyte survey system 100.

At block 1202, a sensor cradle is mounted to a sensor platform. For example, a user or manufacturer of modular sensor core 360 may be configured to mount sensor cradle 128 to platform 110, for example, or to calibration system/portable user interface 1110. In some embodiments, such mounting may include coupling sealable electrical interface 942 to a power supply of platform 110 or to calibration system/portable user interface 1110. At optional block 1204, an external sample gas snorkel is coupled to a sensor cradle. For example, a user or manufacturer of modular sensor core 360 and/or platform 110 may be configured to mount external sample gas snorkel 1030 to platform 110, for example, or to calibration system/portable user interface 1110.

At block 1206, a modular sensor core is secured to a sensor cradle. For example, a user or manufacturer of modular sensor core 360 and/or platform 110 may be configured to mount modular sensor core 360 to sensor cradle 128 of platform 110 and/or sensor cradle 1128 of calibration system/portable user interface 1110. At optional block 1208, mechanical safety measures are installed to secure a modular sensor code to a senor cradle or a platform. For example, a user or manufacturer of modular sensor core 360 and/or platform 110 may be configured to install mechanical safety measures, such as a mechanical strap, to secure modular sensor core 360 to sensor cradle 128 and/or platform 110, for example, and/or to secure modular sensor core 360 to sensor cradle 1128 of calibration system/portable user interface 1110.

Process 1300 of FIG. 13 may generally correspond to a method for maintaining analyte survey system 100.

At block 1302, an exhausted sensor element with a modular sensor core is reported. For example, controller 162, communication module 164, user interface 132, and/or communication module 132 may be configured to report an exhausted sensor element (e.g., one of sensor elements 366 of sensor assembly 166) among various elements of system 100, including displaying an exhausted sensor element alert on user interface 132. In some embodiments, controller 162 may be configured to detect an exhausted sensor element (e.g., a sensor element that is no longer sensitive to its designated analyte) by detecting or reporting a degraded or absent analyte response to a bump check or calibration of modular sensor core 160, for example, or by detecting or reporting an analyte response for a first sensor element that is degraded or absent relative to a second sensor element, where both sensor elements are sensitive to a common analyte.

In block 1304, a cover for a modular sensor core is removed. For example, a user or manufacturer of modular sensor core 360 and/or platform 110 may be configured to remove cover 310 of modular sensor core 360 to access sensor assembly 166. In block 1306, an exhausted sensor element is removed from a modular sensor core. For example, a user or manufacturer of modular sensor core 360 and/or platform 110 may be configured to remove the exhausted sensor element 366 identified in block 1302 from modular sensor core 360. In block 1308, a new sensor element is inserted into a modular sensor core. For example, a user or manufacturer of modular sensor core 360 and/or platform 110 may be configured to insert a new sensor element 366 into modular sensor core 360 to replace the exhausted sensor element 366 removed in block 1306. In block 1310, a cover for a modular sensor core is replaced. For example, a user or manufacturer of modular sensor core 360 and/or platform 110 may be configured to replace cover 310 of modular sensor core 360 to seal sensor assembly 166 and/or other elements of modular sensor core 360 against damage caused by environmental conditions, including moisture and/or heat.

In block 1312, a new sensor element status is reported. For example, controller 162, communication module 164, user interface 132, and/or communication module 132 may be configured to report a status of a new sensor element, including displaying new sensor element bump check response or calibration response on user interface 132. In some embodiments, a calibration process may be performed prior to or as part of such reporting of the status of the new sensor element. Such calibration process may include one or more elements of process 1400 of FIG. 14, for example, including securing modular sensor core 360 to calibration system 1110.

Process 1400 of FIG. 14 may generally correspond to a method for maintaining and/or calibrating analyte survey system 100.

At optional block 1402, external power is provided to a calibration system. For example, a user or manufacturer of modular sensor core 360 and/or platform 110 may be configured to provide external power to calibration system 1100 to ensure calibration system 1100 can perform a bump check process and/or a calibration process, as described herein, and/or to charge supercapacitor 368 of modular sensor core 360.

At block 1404, a calibration system is initialized. For example, a user or manufacturer of modular sensor core 360 and/or platform 110, or controller 112 of calibration system 1110, may be configured to initialize calibration system 1110 by detecting that external power has been provided as in block 1402, for example, or by detecting user selection of one or more of user interfaces 1132 or 1133.

At block 1406, a modular sensor core is secured to a calibration system. For example, a user or manufacturer of modular sensor core 360 and/or platform 110 may be configured to secure or couple modular sensor core 360 to sensor cradle 1128 of calibration system 1110. After such coupling, controller 112 of calibration system 1110 may be configured to receive user selection from user interface 1133 corresponding to performing a bump check of modular sensor core 360, for example, or corresponding to performing a calibration of modular sensor core 360, and process 1400 may proceed to the appropriate block as shown. In various embodiments, calibration system 1110 may be configured to perform a bump check of modular sensor core 360 by default, such as after a predetermined time has passed after controller 112 has detected coupling of modular sensor core 360 to calibration system 1110.

At block 1408, a bump check of a modular sensor core is performed. For example, controller 112 and/or core controller 162 may be configured to perform a bump check of modular sensor core 360. In some embodiments, calibration system 1110 may be configured to provide a bump gas sample (e.g., sourced over sample interface 1122) to modular sensor core 360 over sealable pneumatic interface 922, receive corresponding analyte responses from one or more sensor elements 366 of modular sensor core 360 over sealable electrical interface 942, and determine the one or more sensor elements 366 are operational or exhausted based, at least in part, on the corresponding analyte responses. In various embodiments, such status may be referred to as a bump check result of modular sensor core 360.

At block 1410, a bump check result of a modular sensor core is reported. For example, controller 112 and/or core controller 162 may be configured to report a bump check result of modular sensor core 360 generated in response to the bump check performed in block 1408. In some embodiments, calibration system 1110 may be configured to report a bump check result corresponding to one or more sensor elements 366 of modular sensor core 360 by listing sensor elements 366 on display 1132 and visibly or textually indicating operational or exhausted ones of sensor elements 366. In further embodiments, calibration system 1110 may be configured to report a bump check result corresponding to one or more sensor elements 366 of modular sensor core 360 by issuing an audible indicator corresponding to an all-operational or any-exhausted status of sensor elements 366.

At optional block 1412, a calibration of a modular sensor core is performed. For example, in embodiments where calibration system 1110 is configured to perform a calibration of one or more sensor elements 366 of modular sensor core 360, configuration system 1110 may be configured to perform such calibration process by providing a metered gas sample (e.g., sourced over sample interface 1122) to modular sensor core 360 over sealable pneumatic interface 922, receiving corresponding analyte responses from one or more sensor elements 366 of modular sensor core 360 over sealable electrical interface 942, and determining one or more sensor control signal characteristics and/or sensor signal processing characteristics, and/or associated signal adjustments to calibrate the one or more sensor elements 366 based, at least in part, on the corresponding analyte responses. In various embodiments, such signal characteristics and/or adjustments may be referred to as a calibration result of modular sensor core 360. The time needed to calibrate modular sensor core 360 using such process may vary from approximately 2-20 minutes, depending on the state and number of sensor elements 366 in sensor assembly 166.

At optional block 1414, a calibration result of a modular sensor core is reported. For example, in embodiments where calibration system 1110 is configured to perform a calibration of one or more sensor elements 366 of modular sensor core 360, configuration system 1110 may be configured to report a calibration result of modular sensor core 360 generated in response to the calibration performed in block 1412. In some embodiments, calibration system 1110 may be configured to report a calibration result corresponding to one or more sensor elements 366 of modular sensor core 360 by listing sensor elements 366 on display 1132 and visibly or textually indicating calibrated ones of sensor elements 366. In further embodiments, calibration system 1110 may be configured to report a calibration result corresponding to one or more sensor elements 366 of modular sensor core 360 by issuing an audible indicator corresponding to an all-calibrated or any-non-calibrated status of sensor elements 366.

At block 1418, a modular sensor core is removed from a calibration system. For example, a user or manufacturer of modular sensor core 360 and/or platform 110 may be configured to remove or decouple modular sensor core 360 from sensor cradle 1128 of calibration system 1110. After such coupling, controller 162 of modular sensor core 360 may be configured to use supercapacitor 368 to power sensor elements 366 until modular sensor core 360 is secured in and/or powered by sensor cradle 128 of platform 110, to enable relatively quick deployment of modular sensor core on platform 110.

By providing such systems and techniques for analyte surveying, embodiments of the present disclosure substantially improve the operational flexibility and reliability of unmanned sensor platforms. Moreover, such systems and techniques may be used to increase the operational safety of users of analyte surveying systems, including of unmanned mobile sensor platforms beyond that achievable by conventional systems. As such, embodiments provide analyte survey systems with significantly increased survey convenience and performance.

In accordance with embodiments described herein, analyte survey systems may benefit from a variety of visualization and analyte surveying techniques configured to improve the operational flexibility, reliability, and accuracy of such systems. In particular, embodiments may be configured to provide various display views allowing a user to access and selectively enable such features and capabilities, for example, and may be implemented according to various processes and/or control loops configured to ease pilot burden, protect operation of mobile platforms of such systems, and qualitatively and quantitatively evaluate potential exposure events more quickly and more reliably than conventional systems.

In various embodiments, system 100 may be configured to visualize and characterize a distributed hazardous gas threat through use of mobile platform 110 and sensors mounted to mobile platform 110 for sampling. In general, mobile platform 110 will relay analyte sensor data back to an operator at base station 130 and/or co-pilot station 230 where it will be rendered on or within a geospatial chart to help visualize and characterize the threat. For example, first responders typically need to assess hazardous situations and determine an extent of a related contamination or threat. Elements of system 100 can autonomously map the extents of the hazard gas and overlay resulting sensor data onto a geospatial chart, such that an operator can visualize the full extent of the hazard (e.g., a gas cloud) and proceed safely. Elements of system 100 can also use vision systems to recognize and relay information about warning placards and related information and report specific threats and locations visually. In embodiments where system 100 includes a handheld mobile platform, elements of system 100 can aggregate various data to provide critical and timely warnings and/or safety directives to the user of the handheld platform.

Embodiments may overlay 2D or 3D analyte sensor data onto on geospatial maps as icons or colored highlights or blobs so that users can visualize the extent of a dangerous gas plume. Embodiments may optionally include a second screen/additional base stations so that sensor data can be viewed/operated by user other than the UAV/UGV pilot. Embodiments may use image recognition techniques to read NFPA diamonds and DOT chemical placards using an online or built-in database and relay pertinent hazard information and/or safety directives to users of system 100.

In addition to analyte sensor data provided by embodiments of modular sensor core 160, which are essentially in-situ analyte sensor data, mobile platform 110 may include embodiments of imaging module 142 configured to provide remote analyte sensor data, such as by gas imaging. For example, imaging module 142 may be implemented as a visible spectrum, infrared, and/or multi-spectrum (e.g., visible and infrared, visible and thermal, or visible, infrared, and ultraviolet) imaging module configured to detect the presence of gaseous analytes and/or estimate the concentrations of particular gaseous analytes, based on their emission and/or absorption spectra. Moreover, mobile platform 110 may be implemented with multiple imaging modules each configured to image a scene according to different spectra (e.g., which may be partially overlapping), and system 100 may be configured to combine or blend such imagery to generate multi-spectral imagery that can be used to help guide mobile platform 110 about a hazardous survey area and/or aim gimbal system 122. As such, system 100 may be configured to perform analyte detection according to a variety of different detection protocols associated with the individual types of analyte sensor data and/or combinations of different types of analyte sensor data.

Figure 15A:
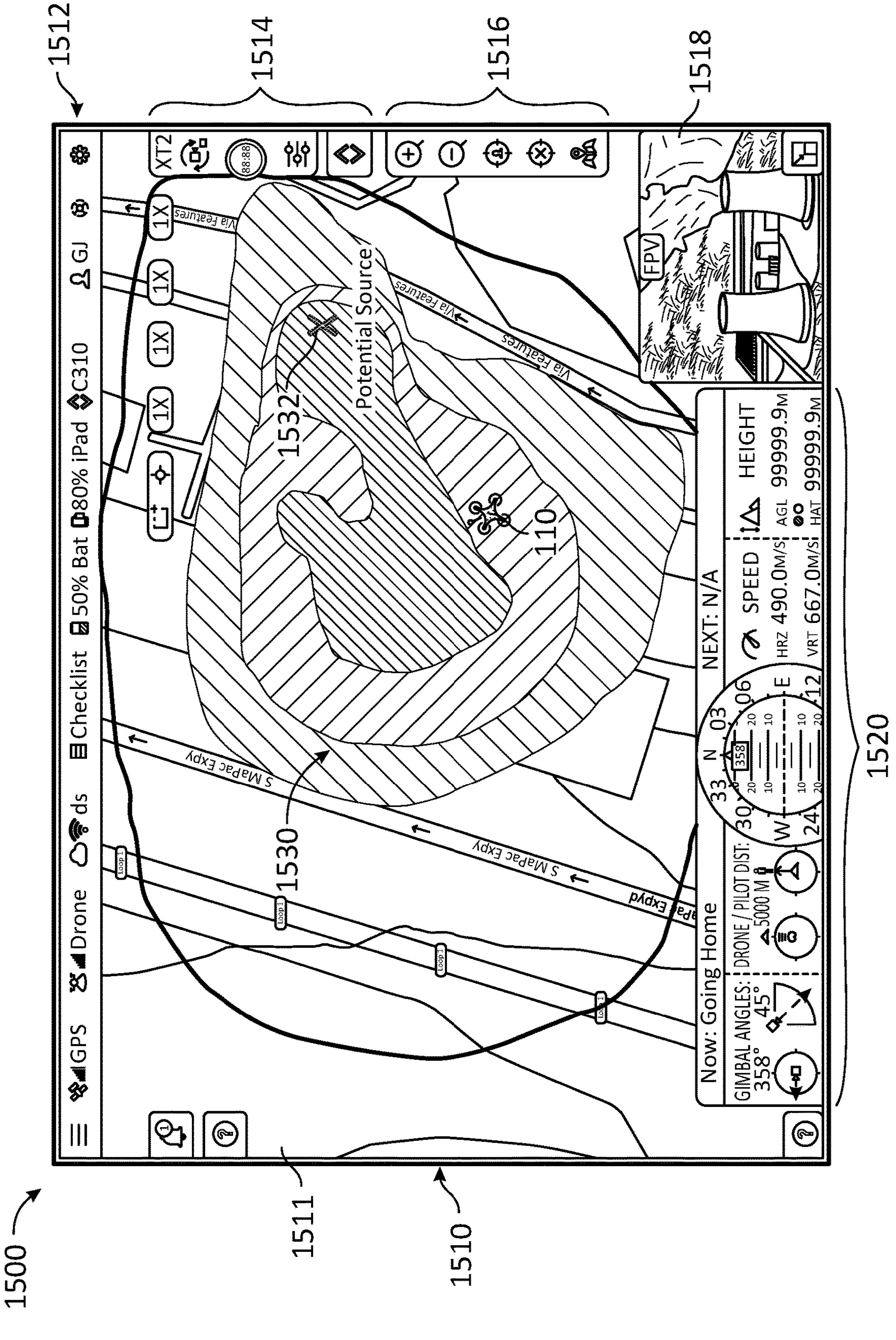
FIGS. 15A-15C and 16A-16C illustrate display views rendered by a user interface for an analyte survey system in accordance with an embodiment of the disclosure.
Figure 15B:
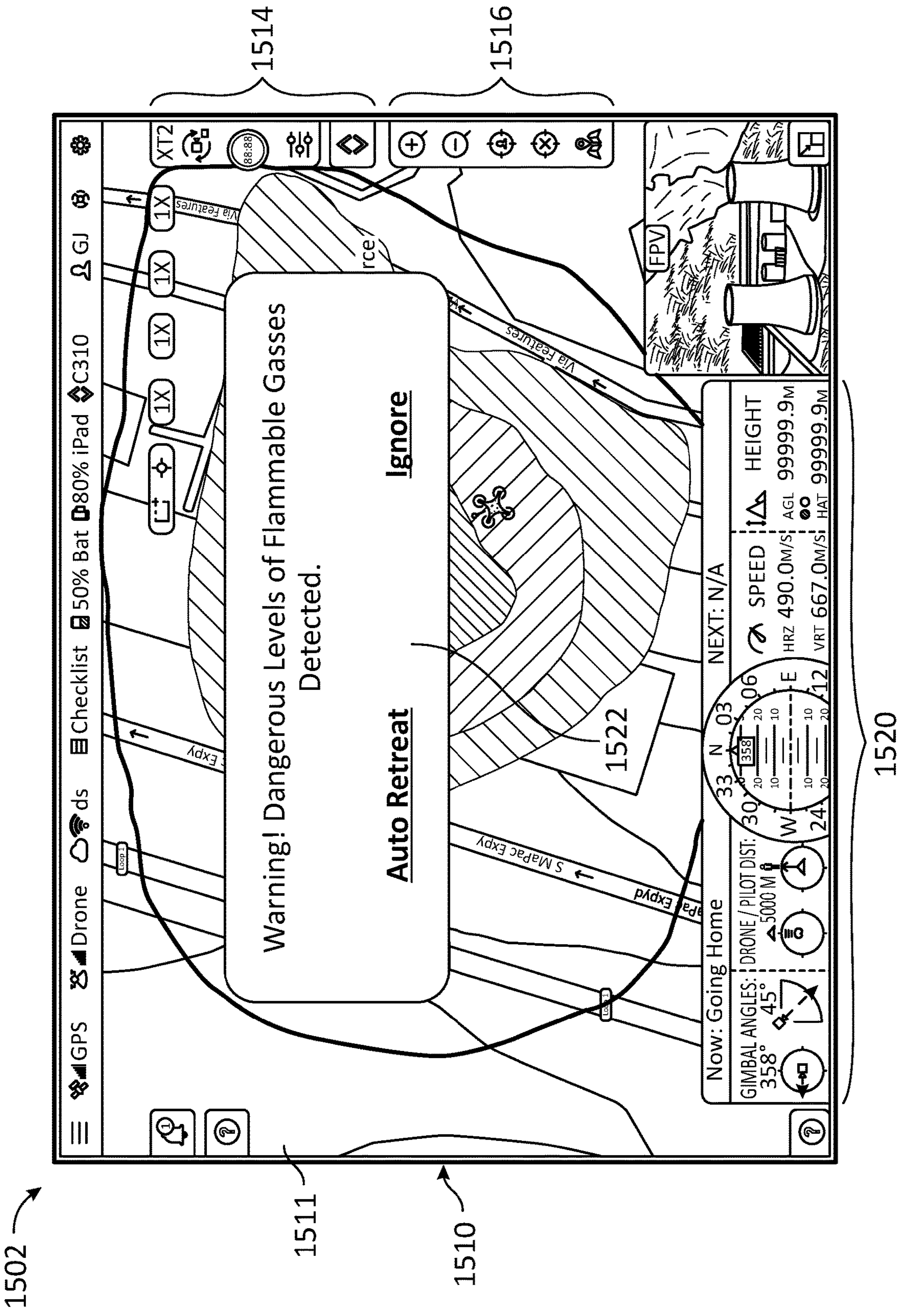
Figure 15C:
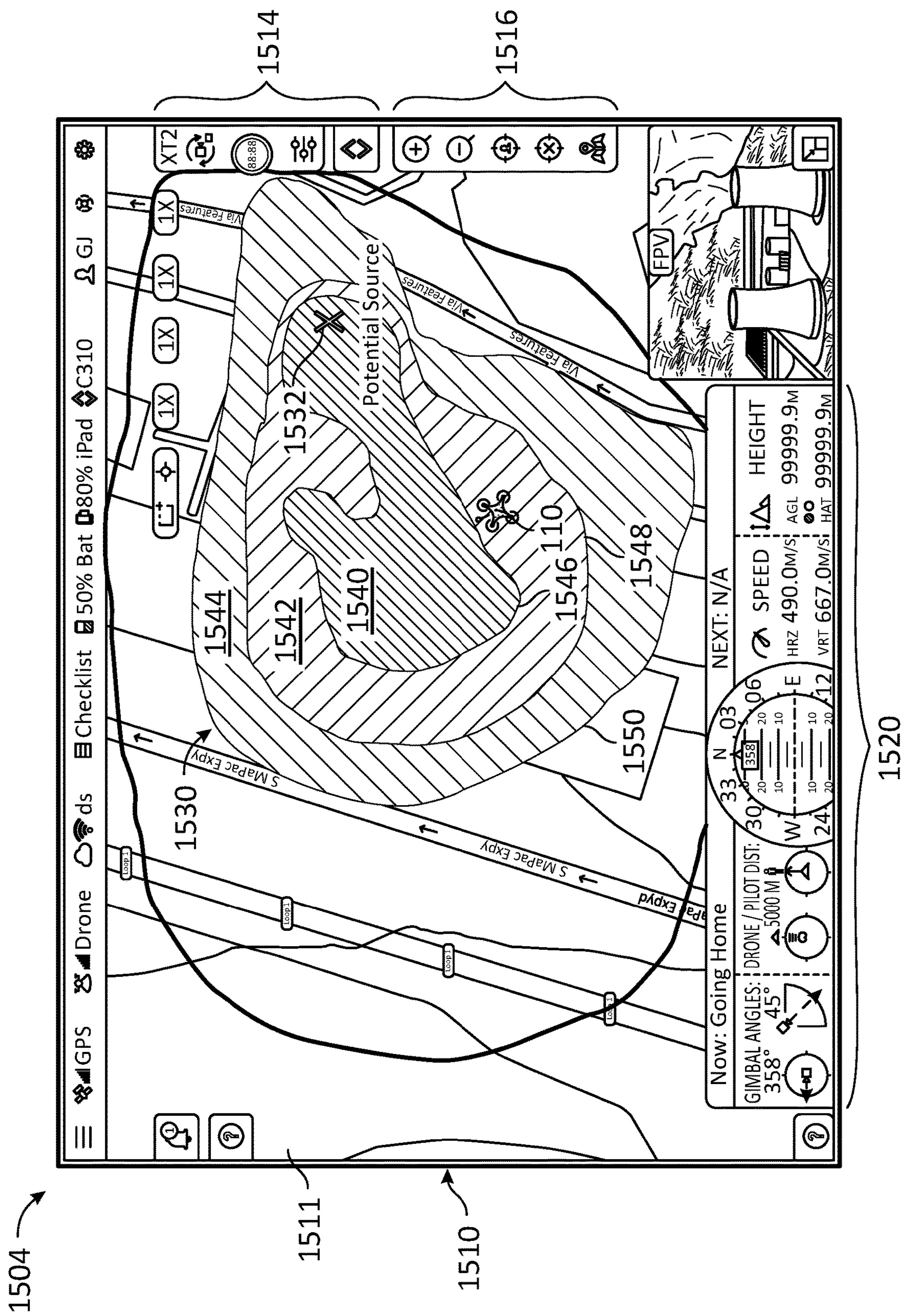

FIGS. 15A-C illustrate display views 1500, 1502, 1504 rendered by a user interface (e.g., user interface 132 of base station 130 and/or co-pilot station 230) for analyte survey system 100 or 200 in accordance with an embodiment of the disclosure. In the embodiment shown in FIG. 15A, display view 1500 includes geospatial chart 1510 surrounded by various selector/indicator groups (e.g., header 1512, payload controller menus 1514 and 1516, video feed 1518, and platform telemetry indicator 1520 configured to visualize and/or quantify analyte detections and operate mobile platform 110 and/or elements of mobile platform 110. For example, header 1512 may include one or more selectors and/or indicators configured to receive user selection of a particular selector to enable, disable, or select active sensor payloads (e.g., imaging module 142, modular sensor core 160) for display of corresponding georeferenced sensor data within geospatial chart 1510, for example, or to indicate an operational status of mobile platform 110 and/or various elements of mobile platform 110.

Payload controller menu 1514 may include one or more selectors or buttons configured to receive user selection of a particular selector to control function of imaging module 142, modular sensor core 160, and/or other sensors of mobile platform 110. Payload controller menu 1516 may also include one or more selectors or buttons configured to receive user selection of a particular selector to control function of imaging module 142, modular sensor core 160, and/or other sensors of mobile platform 110, such as a zoom level, an aperture, a sample gas pump rate, and/or other functions or operational states of sensors of mobile platform 110. Video feed 1518 may be configured to show images or video captured by imaging module 142 (e.g., visible spectrum, infrared spectrum, and/or multi-spectrum images or video) to facilitate piloting of mobile platform 110 or provide situational awareness to a pilot or co-pilot of system 100 or 200. Platform telemetry indicator 1520 may be configured to indicate various types of telemetry associated with a position, orientation, or motion of mobile platform 110, gimbal system 122, modular sensor core 160, and/or other elements of mobile platform 110.

In a specific embodiment, a selector within header 1512 or payload controller menus 1514 or 1516 may be implemented as an automatic drift detection mode selector configured to place mobile platform 110 in an automatic drift detection mode. Once placed in such mode, mobile platform 110 may be configured to control propulsion system 124 to allow mobile platform to drift horizontally and/or vertically according to a local wind impacting mobile platform 110 for a specified period of time (e.g., a drift period associated with the automatic drift detection mode). During such automatic drift detection mode, mobile platform 110 may be configured to determine a first estimated drift velocity due to such wind, yaw mobile platform 110 ninety degrees, measure a second horizontally orthogonal estimated drift velocity due to such wind, and to determine a local wind velocity based on the first and second estimated drift velocities.

For example, to determine an estimated drift velocity, mobile platform 110 may be configured to measure an initial drift position of mobile platform 110 (e.g., using GNSS 118), to allow mobile platform 110 to drift for a preselected period of time or until mobile platform 110 approaches a maneuvering obstacle or hazard, and to measure a final drift position after such preselected time has elapsed, and to determine the estimated drift velocity based on the vector difference between the initial and final drift positions. In various embodiments, the local wind velocity may be the average of the first and second estimated drift velocities. Upon determining the local wind velocity, mobile platform 110 may be configured to exit the automatic drift detection mode and/or hover in place until provided a subsequent maneuvering or analyte detection directive, as described herein.

In the embodiment shown in FIG. 15A, geospatial chart 1510 includes mobile platform indicator 110 and analyte plume overlay 1530 rendered over a base map or chart 1511. In various embodiments, system 100 may be configured to determine a shape, extent, and/or other characteristics of analyte plume overlay 1530 within geospatial chart 1510 based, at least in part, on analyte sensor data provided by modular sensor core 160 and orientation and/or position data provided by orientation sensor 114, GNSS 118, and/or other orientation and/or position or motion sensors of mobile platform 110 or elements of mobile platform 110 as mobile platform maneuvers within the area shown in geospatial chart 1510. For example, system 100 may be configured to determine a concentration distribution associated with the analyte plume, based on analyte sensor data and/or environmental conditions provided by mobile platform 110, and render analyte plume overlay 1530 according to a color mapping to indicate relative concentrations, such as hot colors (e.g., red) to indicate relatively high concentrations of an analyte, and cold colors (e.g., blue) to indicate relatively low concentrations of an analyte. Such color mapping may be based on relative toxicity of the analyte, for example (e.g., high toxicity analytes are red at relatively low absolute concentrations/ppms), and/or on relative hazard to organics, structures, and/or machinery.

In some embodiments, system 100 may be configured to determine various characteristics of analyte plume overlay 1530, as displayed within geospatial chart 1510, based on environmental conditions associated with a survey area corresponding to base map or chart 1511. For example, system 100 may be configured to determine a position of a potential source 1532 of the analyte plume corresponding to analyte plume overlay 1530 based on concentrations of the corresponding analyte measured within geospatial chart 1510 (e.g., by imaging module 142 and/or modular sensor core 160), a determined wind velocity (e.g., measured according to an automatic drift detection mode), ambient temperature, ambient humidity, and/or other environmental conditions affecting spatial evolution of the analyte plume and/or detection of the analyte plume by modular sensor core 160 and/or mobile platform 110.

In another embodiment, system 100 may be configured to determine multiple types of analytes are present within a particular survey area, for example, and render each type of analyte according to a different overlay layer presented in display view 1500, each of which may be selective enabled and/or disabled by a user. Segregated types of analytes may include, for example, flammable analytes, caustic analytes (e.g., hydrogen sulfide), halogenated compounds, odorless suffocation risks, and/or other differentiated types of analytes.

In various embodiments, mobile platform 110 may be configured to adjust its course based on analyte sensor data provided by imaging module 142 and/or modular sensor core 160, for example, and/or based on various environmental conditions measured by sensors mounted to mobile platform 110 or by external systems and communicated to system 100 (e.g., such as regional weather data provided by an online database over a wireless network linked to base station 130 or co-pilot station 230). As such, mobile platform 110 may be configured to autonomously avoid entering hazardous analyte plumes (e.g., hazardous concentrations of an analyte within a particular analyte plume) or environments (e.g., significant downdrafts or otherwise undesirable environmental conditions and/or hazardous analyte plumes within such undesirable environmental conditions). For example, sending a UAV/UGV into a hazardous environment can put mobile platform 110 at risk of damage or contamination requiring replacement or decontamination. By adding intelligent hazard avoidance based on analyte and environmental sensors carried on-vehicle, hazard exposure can be limited through automatic course adjustment, thereby protecting mobile platform 110 and it associated sensor suite.

Embodiments described herein may provide for autonomous reaction to analyte and/or environmental sensor data. For example, controller 112 and/or a controller of base station 130 or co-pilot station 230 may be configured to receive analyte and/or environmental sensor data from mobile platform 110 and/or from sensors mounted to mobile platform 110 and to determine course adjustments to avoid detected hazardous analyte plumes and/or environmental conditions. Examples of course adjustments may include halt, climb, and/or reverse course to retreat from a dangerous environment. Such course adjustments may be relayed to a user of base station 130, for example, or may be implemented directly/autonomously by mobile platform 110. Such autonomous response is intended to preserve the integrity of mobile platform 110 and avoid carrying contamination into other non-contaminated areas. Situations that may prompt these responses include: when a flammable gas sensor element of modular sensor core 160 indicates relatively high concentrations of explosive gases; when a sensor element of modular sensor core 160 indicates relatively high concentrations of a toxic gas; when an oxygen gas sensor element of modular sensor core 160 indicates relatively high or low concentrations of O2 gas; and/or when one or more environmental sensors of mobile platform 110 e.g., other modules 126) indicate damaging high temperatures (such as temperatures associated with flight over a fire).

In general, hazard avoidance course corrections may interrupt manual flight/control or an automatically planned flight/course. A pilot/user may be provided various selectors within a display view, for example, to be able to abort autonomous operations if desired should it be deemed inappropriate for the situation. For example, in the embodiment shown in FIG. 15B, display view 1502 includes many of the same features of display view 1500 but with hazard warning menu 1522 rendered centrally within display view 1502 as an overlay over geospatial chart 1510.

In various embodiments, system 100 may be configured to trigger rendering of hazard warning menu 1522 as mobile platform 110 enters a relatively high concentration or hazardous portion of the analyte plume corresponding to analyte plume overlay 1530, as determined by a position of mobile platform 110 within geospatial chart 1510, for example, and/or based on analyte sensor data provided by imaging module 142 and/or modular sensor core 160. Hazard warning menu 1522 may include alert text indicating the type of hazard (e.g., analyte based or environmental condition based) and one or more selectors allowing a user to cause mobile platform 110 to enter an auto-retreat mode (e.g., where mobile platform 110 autonomously adjusts its course to move away from the detected hazard), allowing a user to cancel and ignore the hazard warning (e.g., so as to provide critical egress guidance to first responders), and/or other selectors associated with other navigation options for system 100.

In some embodiments, hazard warning menu 1522 may include an expedited escape selector configured to cause mobile platform 110 to enter an expedited escape mode where mobile platform 110 controls propulsion system 124 to provide maximum vertical thrust and abruptly increase an altitude of mobile platform 110. In an alternative embodiment, hazard warning menu 1522 may include a selector allowing a user to cause mobile platform 110 to enter an assisted hazard navigation mode, for example, where mobile platform 110 allows a pilot to manually adjust a course of mobile platform 110 in any direction that does not position mobile platform within a relatively high concentration or hazardous portion of an analyte plume. For example, mobile platform 110 may be configured to attenuate any manual user control signals attempting to maneuver mobile platform 110 towards and/or into such hazardous portion.

In some embodiments, hazard warning menu 1522, header 1512, and/or selector/indicator groups of display view 1500 or 1502 may include an analyte concentration contour mapping selector configured to cause mobile platform 110 to enter an analyte concentration contour mapping mode where mobile platform 110 uses analyte sensor data provided by imaging module 142 and/or modular sensor core 160 to determine one or more analyte concentration boundaries and/or corresponding contour lines within a survey area represented in geospatial chart 1510. For example, mobile platform 110 may be configured to move mobile platform 110 within the survey area and about the analyte plume corresponding to analyte plume overlay 1530 to generate sufficient analyte sensor data in order to determine an analyte concentration contour map.

For example, in the embodiment shown in FIG. 15C, display view 1504 includes many of the same features of display view 1500, and additional includes analyte concentration boundaries 1546-1550 bounding respective analyte concentration segments 1540-1544, as shown. For example, mobile platform 110 may approach or enter relatively high analyte concentration segment 1540, receive analyte sensor data from modular sensor core 160 indicating a hazardous concentration of the corresponding analyte, and trigger rendering of hazard warning menu 1522 on base station 130 or co-pilot station 230. A pilot or co-pilot may select an analyte concentration contour mapping selector to cause mobile platform 110 to enter an analyte concentration contour mapping mode, and mobile platform 110 may autonomously maneuver mobile platform 110 about the analyte plume to determine the extents of analyte concentration segments 1540-1544 and/or the spatial contours of analyte concentration boundaries 1546-1550, as shown.

More generally, a pilot or co-pilot may select an analyte concentration contour mapping selector at any time, regardless of whether mobile platform 110 has entered any portion of the analyte plume corresponding to analyte plume overlay 1530. Such autonomous contour mapping provides substantially quicker analyte concentration contour mapping than manual techniques, for example, and a resolution of such mapping may be adjusted to increase spatial definition and reduce mapping speed, or vice versa. In related embodiments, mobile platform 110 may be configured with a concentration finder mode, where upon selection of such mode, mobile platform 110 may be configured to maneuver mobile platform 110 about the analyte plume corresponding to analyte plume overlay 1530 to find a highest or lowest analyte concentration within the survey area shown in geospatial chart 1510.

Figure 16A:
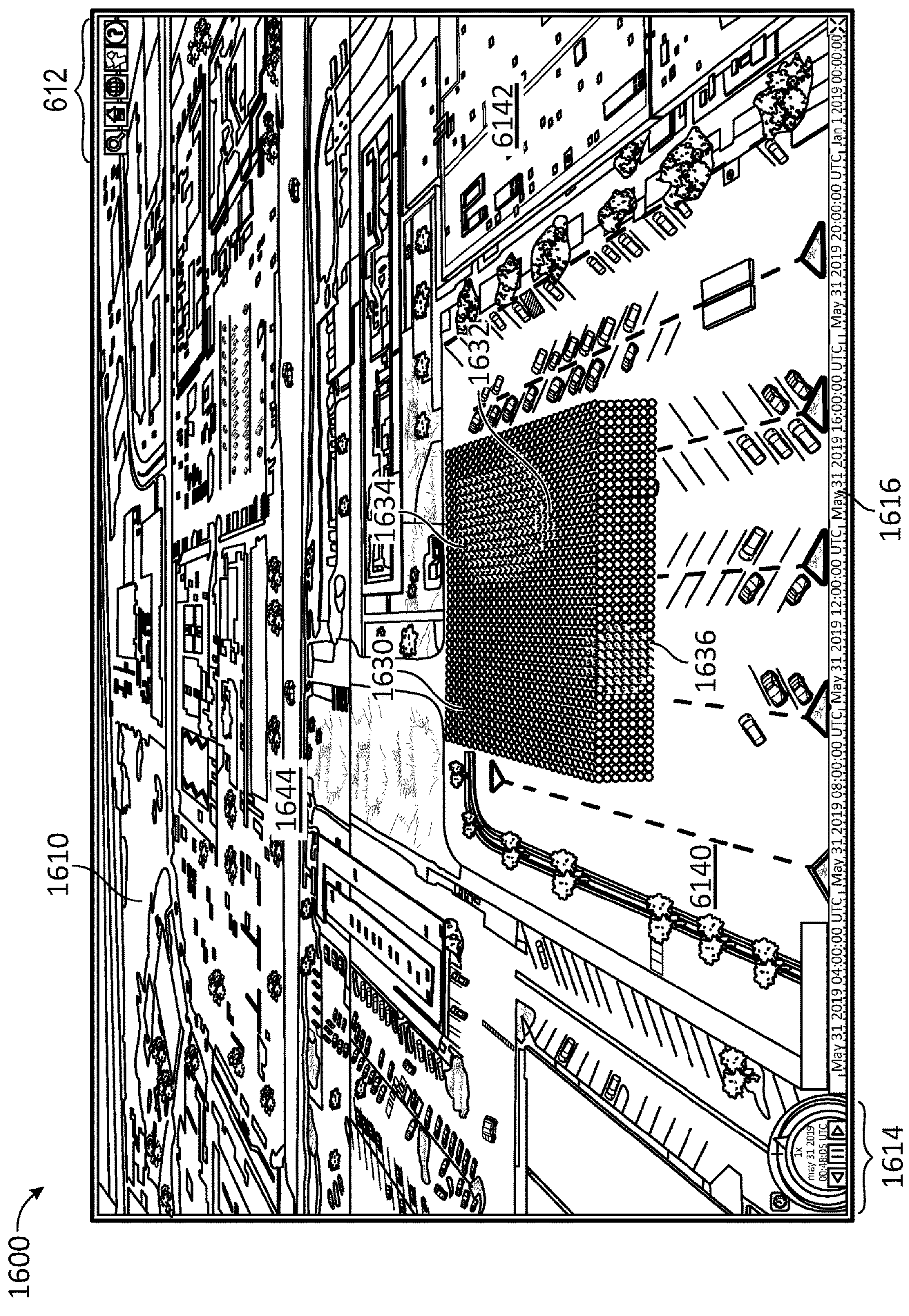
Figure 16B:
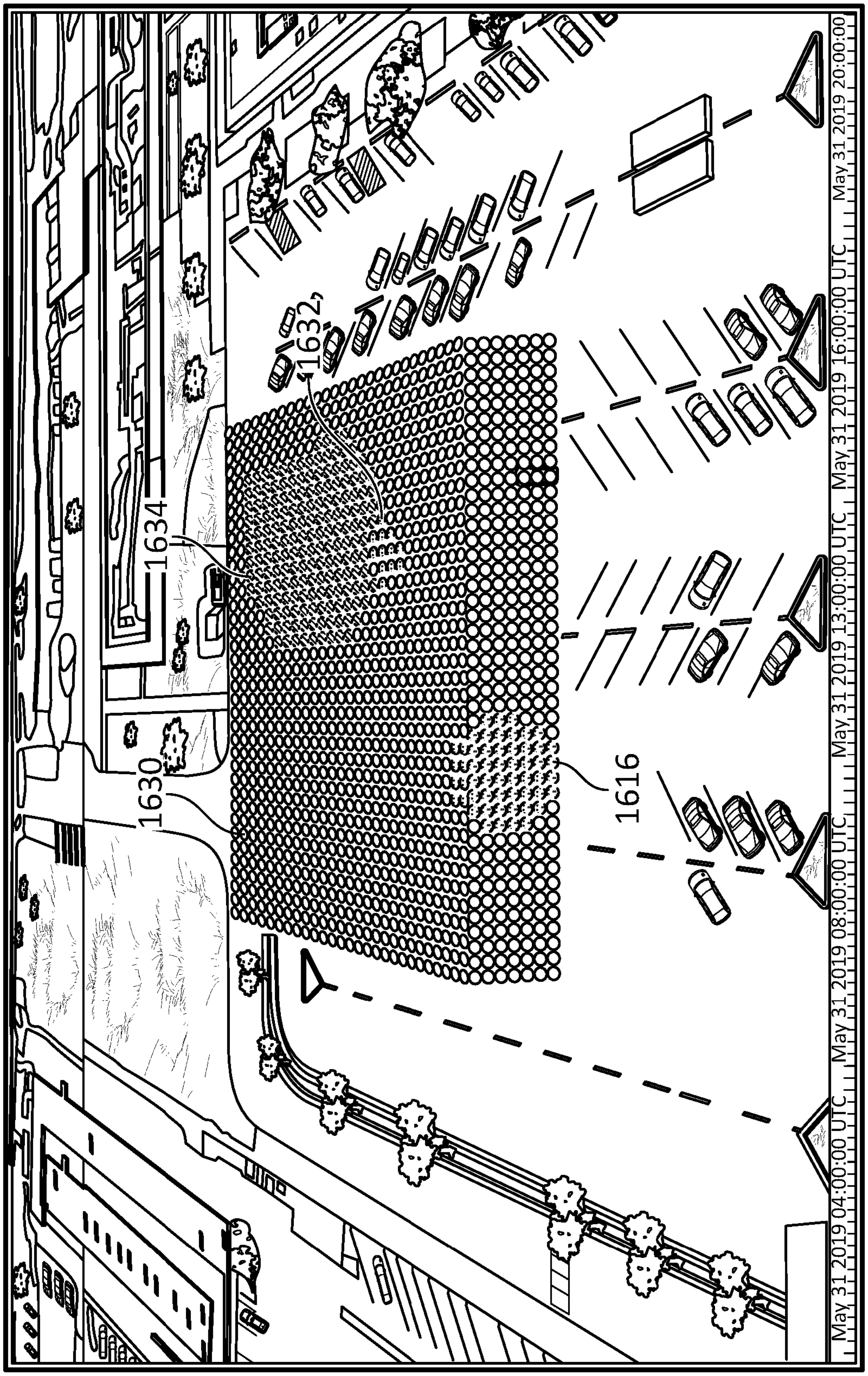
Figure 16C:
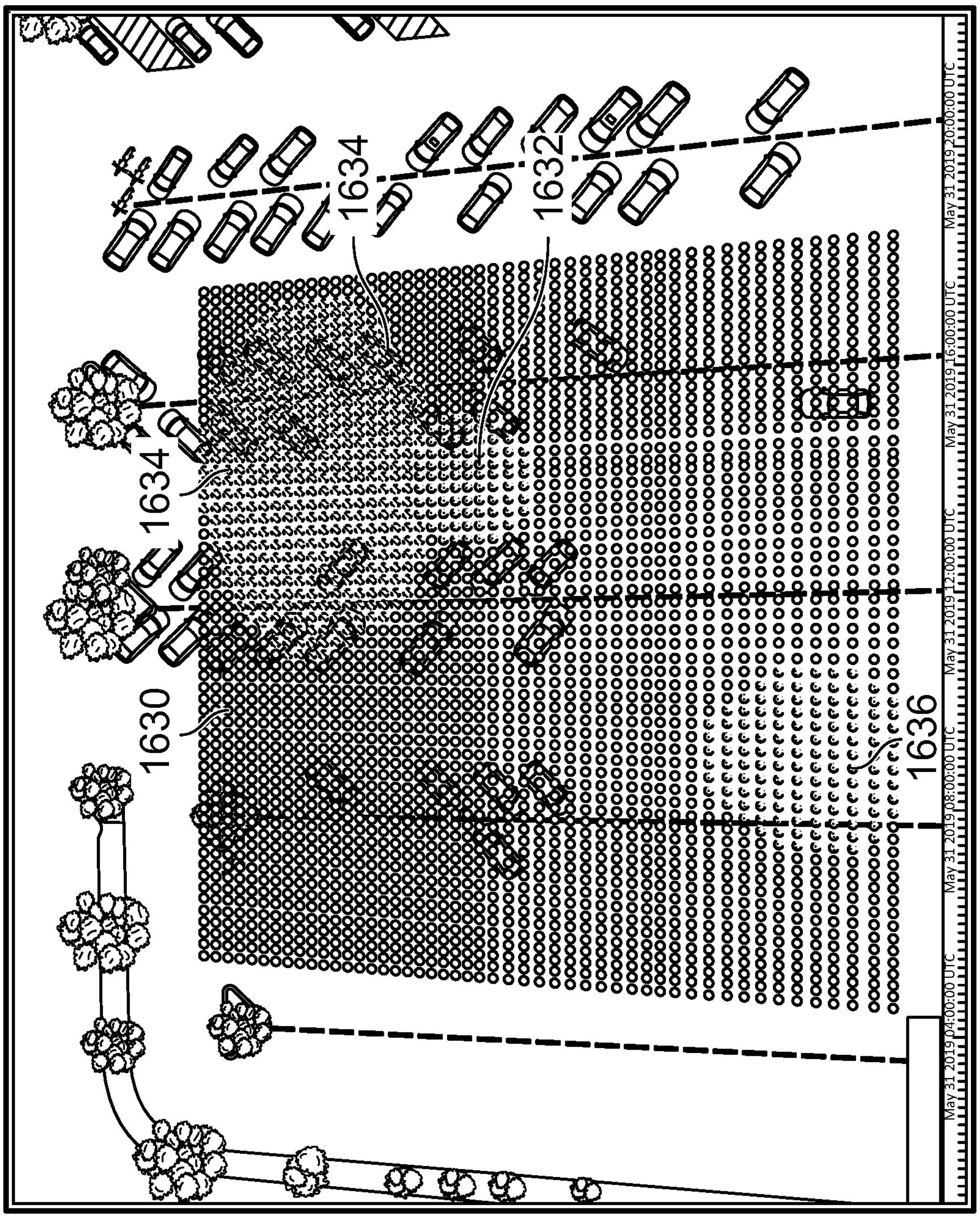

In various embodiments, analyte concentration contour mapping and/or other operational modes of mobile platform 110 may be performed in a plane, such as at a selected altitude, for example, or may be performed volumetrically (e.g., in three dimensions), such as to generate three-dimensional analyte concentration contours. For example, FIGS. 16A-C illustrate display views 1600, 1602, 1604 rendered by a user interface (e.g., user interface 132 of base station 130 and/or co-pilot station 230) for analyte survey system 100 or 200 in accordance with an embodiment of the disclosure. In particular, display views 1600, 1602, 1604 provide three dimensional views of analyte plumes within a survey area 1630. As shown in FIG. 16A, survey area 1630 is disposed above a parking lot 1640 between multiple buildings 1642 and adjacent a highway 1644, all shown in three-dimensional geospatial chart 1610. In display view 1600, survey area/point cloud 1630 includes three analyte plume overlays/point clouds 1632, 1634, and 1636 corresponding to three analyte plumes within the survey area. In particular, analyte plume point clouds 1632 and 1636 correspond to one type of analyte, and analyte plume point cloud 1634 corresponds to a different type of analyte.

Also shown in display view 1600 are various selectors and/or indicators configured to receive user selection of a particular selector to adjust a perspective or other characteristic of display view 1600, geospatial chart 1610, and/or point clouds 1630-1636, for example, or to indicate a status of geospatial chart 1610 and/or point clouds 1630-1636, for example. In particular, header 1612 may include selectors configured to allow a user to change a zoom level or view perspective of display view 1600, time evolution controller 1614 may include selectors configured to allow a user to render any one or more of point clouds 1630-1636 according to a selected time stamp or to animate one or more of point clouds 1630-1636 according to a selected time period and/or rate (e.g., to show how each analyte plume evolves over time), and timeline indicator 1616 may be configured to indicate a particular time or range of times corresponding to a time stamp and/or animation of point clouds 1630-1636. Display view 1602 of FIG. 16B shows a zoomed in perspective of survey area 1630 and analyte plume overlays/point clouds 1632-36, and display view 1604 of FIG. 16C shows a top-down perspective of survey area 1630 and analyte plume overlays/point clouds 1632-36.

In the embodiments shown in FIGS. 16A-C, points within survey area 1630 are colored a neutral color to indicate that the corresponding area has been sampled but no hazardous analyte has been detected. Points within analyte plumes 1630 are colored hot (e.g., red) to indicate relatively high analyte concentrations and colored cold (e.g., blue) to indicate relatively low analyte concentrations. In other embodiments, different analytes may be assigned different colors, for example, and other characteristics of the point clouds (e.g., saturation, opacity, point diameter, and/or other characteristics) may be used to convey concentration to a user. Portions of display views 1600-1604 without points have not been sampled.

In some embodiments, system 100 may be configured to compensate for sensor time lag associated with modular sensor core 160 when linking a particular analyte sensor element response to a position within the survey area depicted by geospatial charts 1510 and/or 1610. For example, sample gas pump 330 may be set to a particular pump rate such that an analyte in a 1 cc sample ingested by modular sensor core 160 (e.g., potentially through sample gas snorkel 1030) may not be registered by a sensor element of modular sensor core 160 for a particular time period, such as 1 second (e.g., a sensor time lag associated with modular sensor core 160). Mobile platform 110 and/or other elements of system 100 may be configured to monitor and log motion of mobile platform 110 and/or various environmental conditions (e.g., a local wind velocity) and compensate for such sensor time lag by linking analyte sensor data spatially and temporally to position data associated with mobile platform 110 (e.g., provided by GNSS 118). By providing such temporal compensation, embodiments are able to survey an particular survey area and/or analyte plume much faster than conventional systems, due to the reduced and/or eliminated sample dwell time at each sample position within the survey area.

Figure 17:
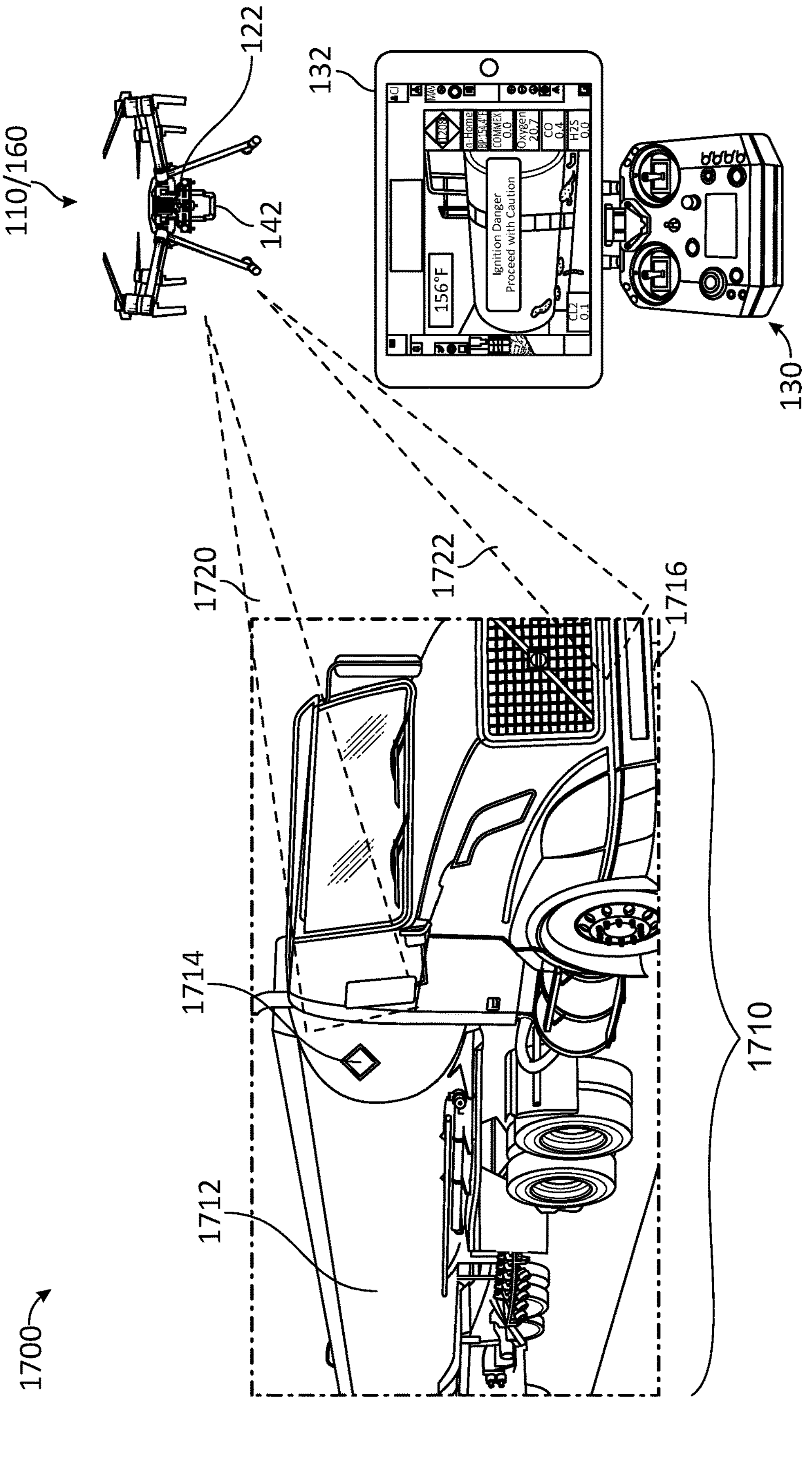
FIG. 17 illustrates a diagram of an analyte survey system in accordance with an embodiment of the disclosure.

As noted herein, embodiments may be configured to capture images of various types of chemical placards and related information, process the images to determine associated analyte characteristics, and determine analyte situation report and/or safety directives associated with the indicated analyte. FIG. 17 illustrates a diagram of analyte survey system 1700 in accordance with an embodiment of the disclosure. In FIG. 17, analyte survey system 1700 includes base station 130 with user interface/display 132, mobile platform 110 (e.g., implemented with articulated imaging system/sensor payload 140, gimbal system 122, modular sensor core 160, and sensor cradle 128), where base station 130 (and/or an optional co-pilot station) may be configured to control motion, position, orientation, and/or general operation of mobile platform 110 and/or elements of mobile platform 110.

In the embodiment shown in FIG. 17, mobile platform 110 is surveying tanker truck 1710 to evaluate a hazard state associated with tanker truck 1710. For example, mobile platform 110 may be configured to scan imaging module 142 along view 1720 to capture images of chemical placard 1714 (e.g., NFPA diamonds and/or DOT placards) and process such images (e.g., using image recognition techniques) to determine the type of analyte contained in tank 1712. System 100 may be configured to reference NIOSH or other similar databases to determine chemical properties of the analyte identified on chemical placard 1714, including but not limited to, boiling point, flash point, density, molecular weight, IDHL, LEL, LD50, etc., and to present such information (or portions thereof) on display 132 of base station 130. Mobile platform 110 may also be configured to scan imaging module 142 along view 1722 to capture images of license plate 1716 or other identifying information and process such images to determine and/or cross reference ownership, contents, and/or legal status of tanker truck 1710 (e.g., by accessing a federal, state, or other online or built-in database or manifest as appropriate). System 100 may be configured to process the same or similar imagery of tanker truck 1710 to recognize the type of tanker or vehicle and estimate the potential volume of analyte carried in tank 1712.

In some embodiments, imaging module 142 may be implemented with a thermal imaging sensor and system 100 may be configured to process radiometric thermal images of tanker truck 1710 and/or a surrounding survey area to identify potential flashpoints (e.g., positions with in the survey area) based on the analyte identified in chemical placard 1714. Such thermal images may also be processed to identify remaining liquid levels within tank 1712. Mobile platform 110 may be configured to relay sensor data and/or processed imagery and related information to base station 130 and/or a co-pilot station, for example, and system 100 may be configured to generate safety directives accordingly, such as to recommend a safe perimeter given the composition and/or estimated volume of the analyte and associated environmental conditions, such as identified flashpoints near or in tanker truck 1710.

Figure 18:
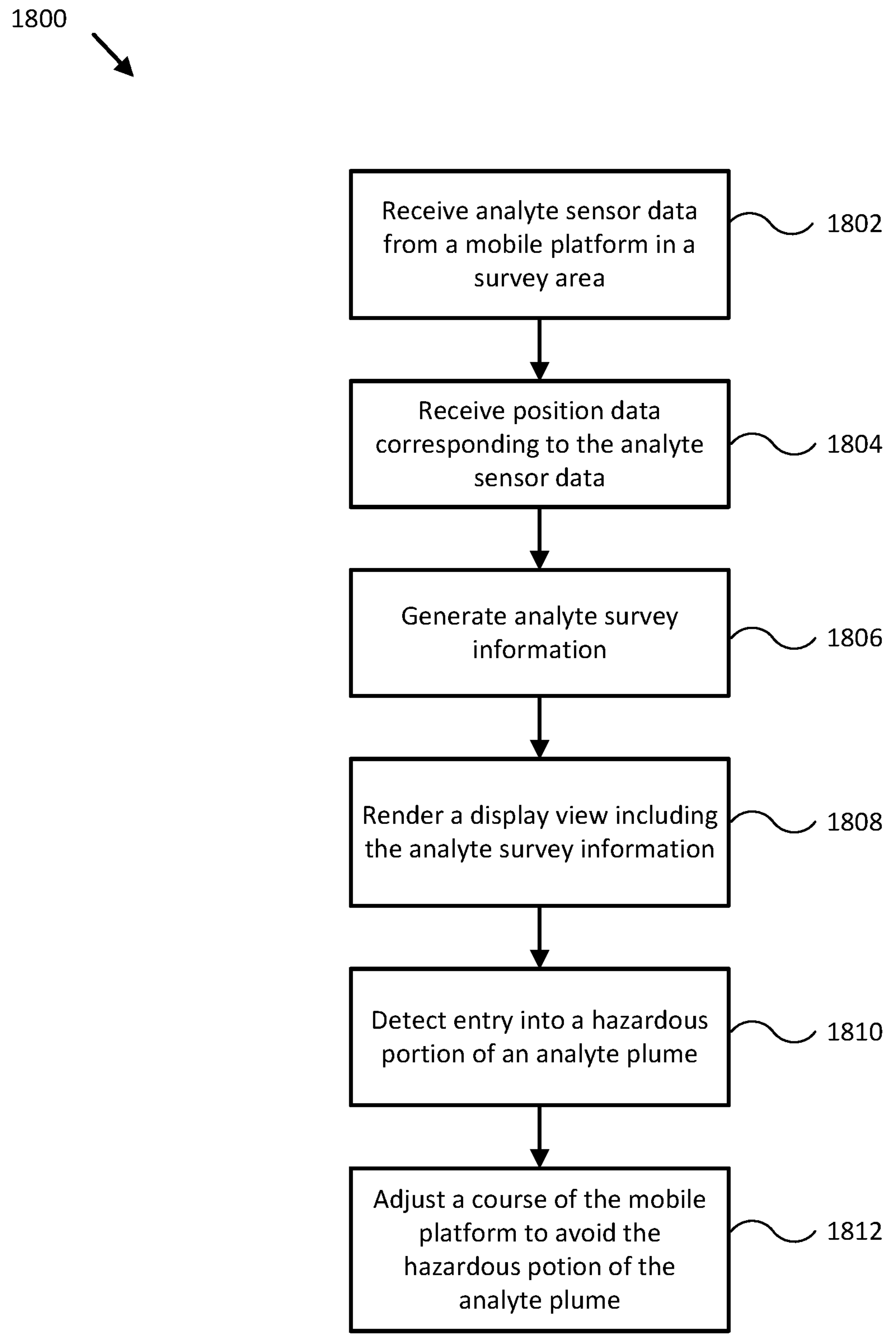
FIGS. 18-20 illustrate flow diagrams of various operations to provide analyte surveying using an analyte survey system in accordance with embodiments of the disclosure.
Figure 19:
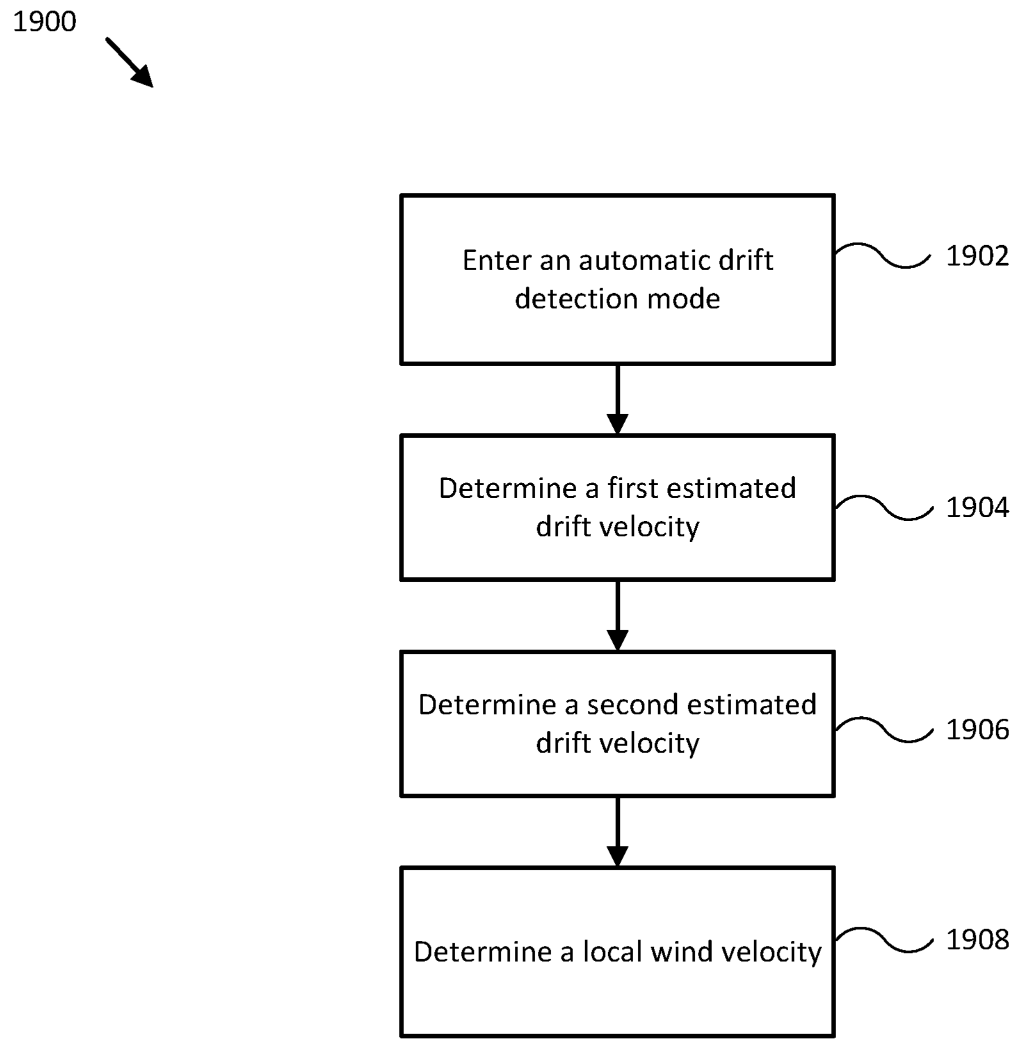
Figure 20:
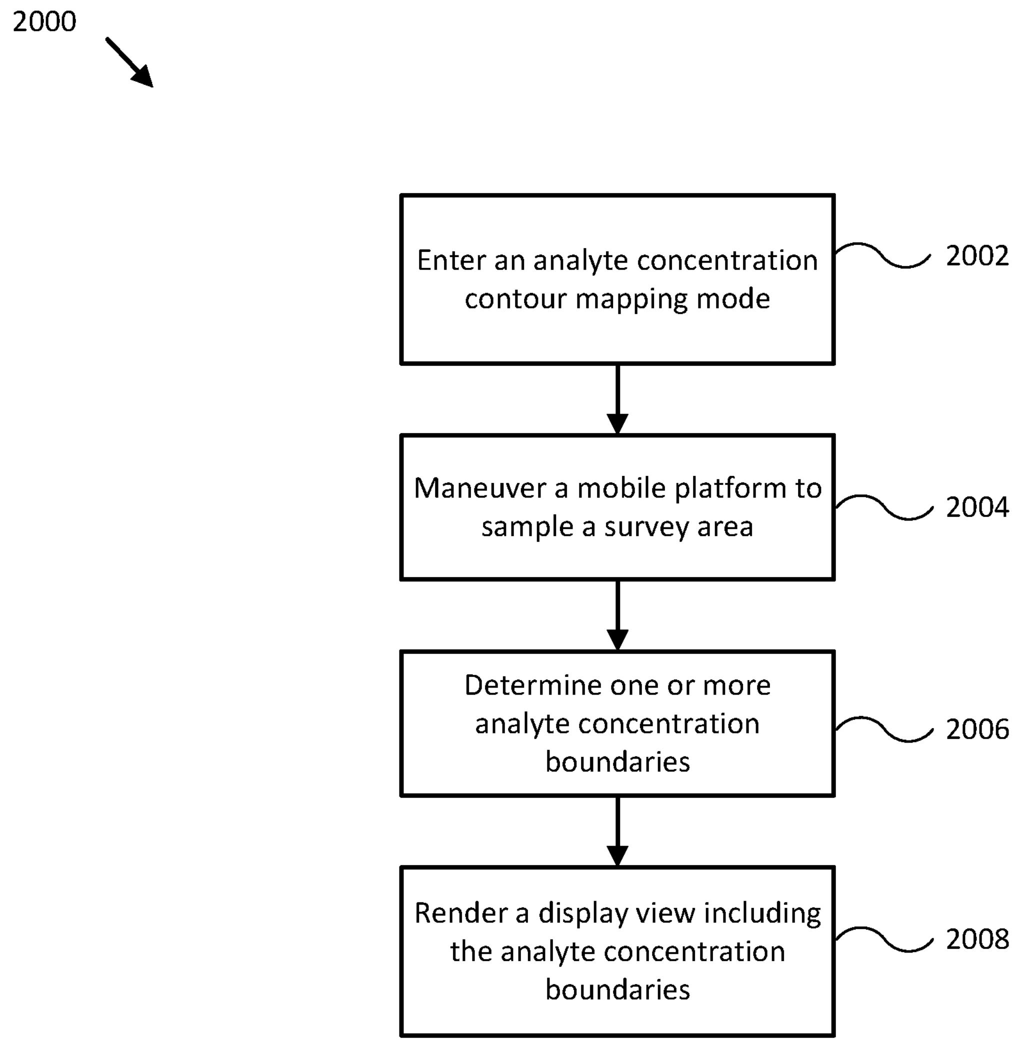

FIGS. 18-20 illustrate flow diagrams of various operations to provide analyte surveying using an analyte survey system in accordance with embodiments of the disclosure.

Process 1800 of FIG. 18 may generally correspond to a method for surveying a survey area using analyte survey system 100.

At block 1802, analyte sensor data from a mobile platform in a survey area is received. For example, controllers 112 and/or 162, communication module 164, user interface 132, communication module 132, and/or other elements of system 100 may be configured to receive analyte sensor data from modular sensor core 160 and/or imaging module 142 as mobile platform 110 maneuvers within a survey area.

In block 1804, position data corresponding to analyte sensor data is received. For example, system 100 may be configured to receive position data corresponding to the analyte sensor data received in block 1802. In block 1806, analyte survey information is generated. For example, system 100 may be configured to generate analyte survey information corresponding to the survey area based, at least in part, on a combination of the position data and the analyte sensor data received in blocks 1802 and 1804.

In block 1808, a display view including analyte survey information is rendered. For example, system 100 may be configured to render a display view comprising the analyte survey information generated in block 1806 in a display of user interface 132. In block 1810, entry into a hazardous portion of an analyte plume is detected. For example, system 100 may be configured to detect entry of mobile platform 110 into a hazardous portion of an analyte plume based, at least in part, on the analyte survey information generated in block 1806. In block 1812, a course of a mobile platform is adjusted. For example, system 100 may be configured to adjust a course of mobile platform 110 to avoid the hazardous portion of the analyte plume detected in block 1810.

Process 1900 of FIG. 19 may generally correspond to a method for determining a local wind velocity within a survey area using analyte survey system 100.

At block 1902, mobile platform 110 enters an automatic drift detection mode. For example, system 100 may be configured to detect user selection of the automatic drift detection mode and communicate the selection to mobile platform 110. In block 1904, a first estimated drift velocity is determined. For example, system 100 may be configured to control propulsion system 124 of mobile platform 110 to allow mobile platform 110 to drift with a wind impacting mobile platform 110 and to determine the first estimated drift velocity associated with the wind impacting the mobile platform based on measurements of such drift. In block 1906, a second estimated drift velocity is determined. For example, system 100 may be configured to control propulsion system 124 of mobile platform 110 to yaw mobile platform 110 approximately ninety degrees and then allow mobile platform 110 to drift with the wind impacting mobile platform 110 and to determine the second estimated drift velocity associated with the wind impacting the mobile platform based on measurements of such drift. In block 1908, a local wind velocity is determined. For example, system 100 may be configured to determine a local wind velocity based, at least in part, on the first and second estimated drift velocities determined in blocks 1904 and 1906.

Process 2000 of FIG. 20 may generally correspond to a method for determining an analyte concentration contour map associated with a survey area using analyte survey system 100.

At block 2002, mobile platform 110 enters an analyte concentration contour mapping mode. For example, system 100 may be configured to detect user selection of the analyte concentration contour mapping mode and communicate the selection to mobile platform 110. In block 2004, mobile platform 110 is maneuvered to sample a survey area. For example, system 100 may be configured to control propulsion system 124 of mobile platform 110 to maneuver mobile platform 110 within a survey area to generate analyte survey information, similar to process 1800 of FIG. 18. In block 2006, one or more analyte concentration boundaries are determined. For example, system 100 may be configured to determine one or more analyte concentration boundaries based, at least in part, on the analyte survey information generated in block 2004. In block 2008, a display view including the analyte concentration boundaries is rendered. For example, system 100 may be configured to render a display view comprising the analyte concentration boundaries determined in block 2006 in a display of user interface 132.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A system comprising:

a mobile platform;

a sensor cradle mounted to the mobile platform, wherein the sensor cradle comprises a first electrical interface and a first pneumatic interface;

a modular sensor core comprising a communication module, a sensor assembly, and a cradle attachment interface comprising:

mounting flanges to releasably couple the modular sensor core to the sensor cradle, a second electrical interface and a second pneumatic interface configured to releasably couple to the first electrical interface and the first pneumatic interface, respectively, of the sensor cradle, and wherein the modular sensor core is configured to receive power over the first and second electrical interfaces and receive samples from a survey area over the first and second pneumatic interfaces;

a logic device configured to communicate with the communication module and the sensor assembly;

wherein the communication module is configured to establish a wireless communication link with a base station associated with the mobile platform, the sensor assembly is configured to provide analyte sensor data as the mobile platform is maneuvered within the survey area, and the logic device is configured to:

receive the analyte sensor data as the mobile platform is maneuvered within the survey area, receive position data corresponding to the analyte sensor data, and generate analyte survey information corresponding to the survey area based, at least in part, on a combination of the position data and the analyte sensor data; and a user interface associated with the mobile platform, wherein the logic device is configured to:

render a display view in a display of the user interface, the display view comprising:

a spatial map comprising the analyte survey information, and a hazard warning associated with the analyte sensor data.

2. The system of claim 1, wherein the sensor assembly comprises a plurality of sensor elements, wherein the logic device is configured to:

detect that a first sensor element of the sensor assembly is exhausted by detecting an analyte response of the first sensor element is degraded or absent relative to a second sensor element of the sensor assembly sensitive to a common analyte;

report the exhausted first sensor element;

detect that a new sensor element has been inserted into the sensor assembly; and report a status of the new sensor element based on a response of the new sensor element to a metered analyte sample provided to the new sensor element.

3. The system of claim 1, further comprising a calibration system for the modular sensor core, wherein:

the calibration system is configured to:

perform a bump check or a calibration of the modular sensor core, and report a bump check result or a calibration result of the modular sensor core; and the logic device is configured to:

detect the modular sensor core is secured to the calibration system, control a power supply of the modular sensor core to draw power from the calibration system, detect removal of the modular sensor core from the calibration system, and control the power supply of the modular sensor core to draw power from an internal power supply of the modular sensor core.

4. The system of claim 1, wherein the logic device is configured to:

detect entry of the mobile platform into a hazardous portion of an analyte plume based, at least in part, on the analyte survey information;

adjust a course of the mobile platform to avoid the hazardous portion of the analyte plume;

control a propulsion system of the mobile platform to allow the mobile platform to drift with a wind impacting the mobile platform;

determine a first estimated drift velocity associated with the wind impacting the mobile platform;

control the propulsion system of the mobile platform to yaw the mobile platform approximately ninety degrees and then allow the mobile platform to drift with the wind impacting the mobile platform;

determine a second estimated drift velocity associated with the wind impacting the mobile platform; and determine a local wind velocity based, at least in part, on the first and second estimated drift velocities.

5. The system of claim 1, wherein the logic device is configured to:

determine one or more analyte concentration boundaries based, at least in part, on the analyte survey information; and render a display view comprising the analyte concentration boundaries in a display of a user interface associated with the mobile platform.

6. The system of claim 1, further comprising an imaging module coupled to the mobile platform, wherein the logic device is configured to:

receive visible spectrum and/or infrared images of the survey area from the imaging module as the mobile platform maneuvers within the survey area; and generate the analyte survey information corresponding to the survey area based, at least in part, on a combination of the position data, the analyte sensor data, and the visible spectrum and/or infrared images of the survey area.

7. The system of claim 1, wherein:

the sensor cradle is selectively mounted to the mobile platform;

the cradle attachment interface is configured to releasably couple the modular sensor core to an external gas snorkel and/or a calibration system; and the sensor cradle comprises mechanical latches and mechanical lock releases allowing the mounting flanges to selectively engage or disengage with the mechanical latches.

8. The system of claim 1, wherein the modular sensor core comprises:

sample element receptacles associated with corresponding sample elements of the sensor assembly; and a piezoelectric pump configured to draw sample gas into the sample element receptacles to allow the sample elements to detect one or more analytes and/or concentrations of such analytes in the sample gas.

9. A method of operating the system of claim 1, the method comprising:

maneuvering the mobile platform within the survey area;

providing, by the sensor assembly, the analyte sensor data in response to analytes detected by the sensor assembly during the maneuvering;

receiving the position data corresponding to the analyte sensor data; and generating the display view.

10. The system of claim 1, wherein the logic device is configured to: detect that the modular sensor core is secured to the sensor cradle mounted to the mobile platform; and control a power supply of the modular sensor core to draw power from the mobile platform over the sensor cradle.

11. A method comprising:

receiving analyte sensor data from a modular sensor core coupled to a mobile platform as the mobile platform is maneuvered within a survey area, wherein the modular sensor core comprises a sensor assembly and a cradle attachment interface, the cradle attachment interface comprising:

mounting flanges to releasably couple the modular sensor core to a sensor cradle mounted to the mobile platform, wherein the sensor cradle comprises a first electrical interface and a first pneumatic interface, a second electrical interface and a second pneumatic interface configured to releasably couple to the first electrical interface and the first pneumatic interface, respectively, of the sensor cradle, and wherein the modular sensor core is configured to receive power over the first and second electrical interfaces and receive samples at the sensor assembly from the survey area over the first and second pneumatic interfaces;

receiving position data corresponding to the analyte sensor data;

generating analyte survey information corresponding to the survey area based, at least in part, on a combination of the position data and the analyte sensor data;

rendering a display view in a display of a user interface associated with the mobile platform, the display view comprising:

a spatial map comprising the analyte survey information, and a hazard warning associated with the analyte sensor data; and wherein the method is performed by a logic device.

12. The method of claim 11, wherein the sensor assembly comprises a plurality of sensor elements, the method further comprising:

detecting that a first sensor element of the sensor assembly is exhausted by detecting an analyte response of the first sensor element is degraded or absent relative to a second sensor element of the sensor assembly sensitive to a common analyte;

reporting the exhausted first sensor element;

detecting that a new sensor element has been inserted into the sensor assembly; and reporting a status of the new sensor element based on a response of the new sensor element to a metered analyte sample provided to the new sensor element.

13. The method of claim 11, further comprising:

initializing a calibration system for the modular sensor core;

mounting the modular sensor core to a sensor cradle of a calibration system;

performing a bump check or a calibration of the modular sensor core;

detecting the modular sensor core is secured to a calibration system;

controlling a power supply of the modular sensor core to draw power from the calibration system;

detecting removal of the modular sensor core from the calibration system;

controlling the power supply of the modular sensor core to draw power from an internal power supply of the modular sensor core;

detecting the modular sensor core is secured to a sensor cradle of a mobile platform; and drawing power from the mobile platform over the sensor cradle of the mobile platform.

14. The method of claim 11, further comprising performing by the logic device:

detecting entry of the mobile platform into a hazardous portion of an analyte plume based, at least in part, on the analyte survey information;

adjusting a course of the mobile platform to avoid the hazardous portion of the analyte plume;

controlling a propulsion system of the mobile platform to allow the mobile platform to drift with a wind impacting the mobile platform;

determining a first estimated drift velocity associated with the wind impacting the mobile platform;

controlling the propulsion system of the mobile platform to yaw the mobile platform approximately ninety degrees and then allow the mobile platform to drift with the wind impacting the mobile platform;

determining a second estimated drift velocity associated with the wind impacting the mobile platform; and determining a local wind velocity based, at least in part, on the first and second estimated drift velocities.

15. The method of claim 11, further comprising performing by the logic device:

determining one or more analyte concentration boundaries based, at least in part, on the analyte survey information; and rendering a display view comprising the analyte concentration boundaries in a display of a user interface associated with the mobile platform.

16. The method of claim 11, further comprising performing by the logic device:

receiving visible spectrum and/or infrared images of the survey area from an imaging module as the mobile platform maneuvers within the survey area; and generating the analyte survey information corresponding to the survey area based, at least in part, on a combination of the position data, the analyte sensor data, and the visible spectrum and/or infrared images of the survey area.

17. The method of claim 11, wherein:

the sensor cradle is selectively mounted to the mobile platform;

the cradle attachment interface is configured to releasably couple the modular sensor core to an external gas snorkel and/or a calibration system;

the sensor cradle comprises mechanical latches and mechanical lock releases allowing the mounting flanges to selectively engage or disengage with the mechanical latches.

18. The method of claim 11, wherein the modular sensor core comprises:

sample element receptacles associated with corresponding sample elements of the sensor assembly, and a piezoelectric pump configured to draw sample gas into the sample element receptacles to allow the sample elements to detect one or more analytes and/or concentrations of such analytes in the sample gas.

19. The method of claim 11, further comprising:

maneuvering the mobile platform within the survey area;

providing, by the sensor assembly, the analyte sensor data in response to analytes detected by the sensor assembly during the maneuvering;

receiving the position data corresponding to the analyte sensor data; and generating the display view.

20. The method of claim 11, further comprising: detecting that the modular sensor core is secured to the sensor cradle mounted to the mobile platform; and controlling a power supply of the modular sensor core to draw power from the mobile platform over the sensor cradle.

* * * * *